United States Patent
Dormody et al.

(10) Patent No.: US 11,536,564 B2
(45) Date of Patent: Dec. 27, 2022

(54) SYSTEMS AND METHODS FOR PRESSURE-BASED ESTIMATION OF A MOBILE DEVICE ALTITUDE OR CALIBRATION OF A PRESSURE SENSOR

(71) Applicant: NextNav, LLC, Sunnyvale, CA (US)

(72) Inventors: Michael Dormody, San Jose, CA (US); Badrinath Nagarajan, Cupertino, CA (US); Guiyuan Han, San Jose, CA (US)

(73) Assignee: NextNav, LLC, Sunnyvale, CA (US)

( * ) Notice: Subject to any disclaimer, the term of this patent is extended or adjusted under 35 U.S.C. 154(b) by 464 days.

(21) Appl. No.: 16/405,687

(22) Filed: May 7, 2019

(65) Prior Publication Data

US 2020/0116483 A1 Apr. 16, 2020

Related U.S. Application Data

(60) Provisional application No. 62/745,175, filed on Oct. 12, 2018.

(51) Int. Cl.
*G01C 5/06* (2006.01)
*G01L 27/00* (2006.01)

(52) U.S. Cl.
CPC .............. *G01C 5/06* (2013.01); *G01L 27/002* (2013.01)

(58) Field of Classification Search
CPC ................................. G01C 5/06; G01L 27/002
See application file for complete search history.

(56) References Cited

U.S. PATENT DOCUMENTS

| | | | |
|---|---|---|---|
| 5,383,122 A * | 1/1995 | Ohaeri | G06G 7/57 324/324 |
| 8,130,141 B2 | 3/2012 | Pattabiraman et al. | |
| 9,057,606 B2 | 6/2015 | Wolf et al. | |
| 9,618,337 B2 * | 4/2017 | Chun | G01C 5/06 |
| 9,980,246 B2 | 5/2018 | Pattabiraman et al. | |

(Continued)

FOREIGN PATENT DOCUMENTS

WO  WO-2008148649 A1 * 12/2008 .............. G01C 5/06

OTHER PUBLICATIONS

Polynomial regression (Year: 2015).*

(Continued)

*Primary Examiner* — Eman A Alkafawi
*Assistant Examiner* — Aeysha N Sultana
(74) *Attorney, Agent, or Firm* — MLO, a professional corp.

(57) ABSTRACT

Pressure-based estimation of a mobile device altitude or calibration of a pressure sensor involves machines that determine if a reference-level pressure value based on one or more measurements of pressure from a network of weather stations should or should not be used to calibrate a pressure sensor of a mobile device or to estimate an altitude of the mobile device. If reference-level pressure value should be used, the reference-level pressure value is used to calibrate a pressure sensor of a mobile device or to estimate an altitude of the mobile device. If the reference-level pressure value should not be used, a trend in pressure is determined, an estimated reference-level pressure value based on the trend is determined, and the estimated reference-level pressure value is used to calibrate a pressure sensor of a mobile device or to estimate an altitude of the mobile device.

18 Claims, 16 Drawing Sheets

Pressure measurements from a network of weather stations can be used to estimate an altitude of a mobile device 120, or to calibrate pressure measurements of the mobile device 120

(56) References Cited

U.S. PATENT DOCUMENTS

| | | | | |
|---|---|---|---|---|
| 2003/0136191 | A1* | 7/2003 | Tsuji | G01C 5/06 73/1.79 |
| 2010/0043408 | A1* | 2/2010 | Girot | F02D 41/2451 60/287 |
| 2010/0248662 | A1* | 9/2010 | Sheynblat | H04W 52/0274 455/127.1 |
| 2014/0135040 | A1* | 5/2014 | Edge | G01C 5/06 455/456.6 |
| 2014/0156570 | A1* | 6/2014 | Randerath | G05B 23/024 706/12 |
| 2014/0200846 | A1* | 7/2014 | Wachter | G01C 5/06 702/138 |
| 2016/0245716 | A1* | 8/2016 | Gum | G01L 27/002 |
| 2017/0195984 | A1* | 7/2017 | Dormody | G01C 5/06 |
| 2017/0280301 | A1 | 9/2017 | Chang et al. | |
| 2018/0062393 | A1* | 3/2018 | Bou-Zeid | G01P 5/14 |
| 2018/0073951 | A1* | 3/2018 | Venkatraman | G01C 5/06 |
| 2018/0255431 | A1* | 9/2018 | Robertson | H04W 4/023 |

OTHER PUBLICATIONS

Moffat et al., "Comprehensive comparison of gap-filling techniques for eddy covariance net carbon fluxes", Agricultural and Forest Meteorology, vol. 147, Issues 3-4, Dec. 10, 2007, pp. 209-232.

Sankaran et al., "Using Mobile Phone Barometer for Low-Power Transportation Context Detection", SenSys '14 Proceedings of the 12th ACM Conference on Embedded Network Sensor Systems, Nov. 3-6, 2014, pp. 191-205.

Henn et al., "A Comparison of Methods for Filling Gaps in Hourly Near-Surface Air Temperature Data", Journal of Hydometeorology, American Meteorological Society, vol. 14, Jun. 2013, pp. 929-945.

Ghaderi et al., "Deep Forecast: Deep Learning-based Spatio-Temporal Forecasting", ICML 2017 Time Series Workshop, Sydney, Australia, 2017, 6 pages.

Germann et al., "Scale-Dependence of the Predictability of Precipitation from Continental Radar Images. Part I: Description of the Methodology", American Meteorological Society, Monthly Weather Review, vol. 130, Dec. 2002, pp. 2859-2873.

\* cited by examiner

Pressure measurements from a network of weather stations can be used to estimate an altitude of a mobile device 120, or to calibrate pressure measurements of the mobile device 120

SYSTEMS AND METHODS FOR PRESSURE-BASED ESTIMATION OF A MOBILE DEVICE ALTITUDE OR CALIBRATION OF A PRESSURE SENSOR

BACKGROUND

Determining the exact location of a mobile device (e.g., a smart phone operated by a user) in an environment can be quite challenging, especially when the mobile device is located in an urban environment or is located within a building. Imprecise estimates of the mobile device's altitude, for example, may have life or death consequences for the user of the mobile device since the imprecise altitude estimate can delay emergency personnel response times as they search for the user on multiple floors of a building. In less dire situations, imprecise altitude estimates can lead a user to the wrong area in an environment.

Different approaches exist for estimating an altitude of a mobile device. In a barometric-based location determination system, such as the system shown in FIG. 1, altitude can be computed using a measurement of pressure from a pressure sensor of a mobile device 120 along with ambient pressure measurement(s) from a calibrated network of reference pressure sensors (e.g., weather stations) 130, and a measurement of ambient temperature (e.g., from the network or other source). An estimate of an altitude of a mobile device ($h_{mobile}$) can be computed by the mobile device 120, a server, or another machine that receives needed information as follows:

$$h_{mobile} = h_{sensor} - \frac{RT_{remote}}{gM}\ln\left(\frac{P_{sensor}}{P_{mobile}}\right), \quad \text{(Equation 1)}$$

where $P_{mobile}$ is the estimate of pressure at the location of the mobile device by a pressure sensor of the mobile device, $P_{sensor}$ is an accurate estimate of pressure at the location of a reference pressure sensor 130 (e.g., accurate to within a tolerated amount of pressure from true pressure, such <5 Pa), $T_{remote}$ is an accurate estimate of temperature (e.g., in Kelvin) at the location of the reference pressure sensor 130 or a different location of a remote temperature sensor, $h_{sensor}$ is an estimated altitude of the reference pressure sensor 130 (e.g., estimated to within a desired amount of altitude error, such as 0.5 meters), g corresponds to the acceleration due to gravity, R is a gas constant, and M is molar mass of air (e.g., dry air or other). The minus sign (−) may be substituted with a plus sign (+) in alternative embodiments of Equation 1, as would be understood by one of ordinary skill in the art. The estimate of pressure at the location of the reference pressure sensor 130 can be converted to an estimated reference-level pressure that corresponds to the reference pressure sensor 130 in that it specifies an estimate of pressure at the latitude and longitude of the reference pressure sensor 130, but at a reference-level altitude that likely differs from the altitude of the reference pressure sensor 130. The reference-level pressure can be determined as follows:

$$P_{ref} = P_{sensor} \times \exp\left(-\frac{gM(h_{ref} - h_{sensor})}{RT_{remote}}\right), \quad \text{(Equation 2)}$$

where $P_{sensor}$ is the estimate of pressure at the location of the reference pressure sensor 130, $P_{ref}$ is the reference-level pressure estimate and $h_{ref}$ is the reference-level altitude. The altitude of the mobile device $h_{mobile}$ can be computed using Equation 1, where $h_{ref}$ is substituted for $h_{sensor}$ and $P_{ref}$ is substituted for $P_{sensor}$. The reference-level altitude $h_{ref}$ may be any altitude and is often set at mean sea-level (MSL). When two or more reference-level pressure estimates are available, the reference-level pressure estimates are combined into a single reference-level pressure estimate value (e.g., using an average, weighted average, or other suitable combination of the reference pressures), and the single reference-level pressure estimate value is used for the reference-level pressure estimate $P_{ref}$.

The accuracy of the estimated altitude of the mobile device depends on two measurements of pressure. A first measurement is reference-level pressure determined from measurement(s) of pressure from one or more of the reference pressure sensors 130 of the network. A second measurement is a measurement of pressure from an unstable pressure sensor of the mobile device. Due to drift, which is a phenomenon whereby measurements of pressure from an unstable pressure sensor deviate from the true values of pressure over time, the unstable pressure sensor of the mobile device must be regularly calibrated using a reference-level pressure corresponding to a reference pressure sensor. One approach for calibrating a pressure sensor of the mobile device relies on a reference-level pressure determined from measurement(s) of pressure from one or more of the reference pressure sensors 130 of the network for an earlier time. Since an estimated altitude $h_{mobile}$ is computed as:

$$h_{mobile} = h_{ref} - \frac{RT_{remote}}{gM}\ln\left(\frac{P_{ref}}{P_{mobile}}\right). \quad \text{(Equation 3)}$$

An aim for calibrating the pressure sensor of the mobile device is to determine an adjustment to the value of $P_{mobile}$ such that $h_{mobile}$ is within a tolerated amount of distance from the true altitude of the mobile device, $h_{truth}$. During calibration, a known representative altitude of the area in which the mobile device is expected to reside based on an estimated position of the mobile device can be assigned as the representative true altitude of the mobile device, $h_{truth}$, which may or may not include an adjustment of a typical height at which the mobile device is likely to be held above the ground or floor of the area. Once the representative true altitude of the mobile device, $h_{truth}$, is determined, a calibration value C needed to adjust the estimate of pressure at the location of the mobile device, $P_{mobile}$, is determined using a combination of Equation 3 and the following equation to solve for C:

$$h_{truth} = h_{ref} - \frac{RT_{remote}}{gM}\ln\left(\frac{P_{ref}}{C + P_{mobile}}\right). \quad \text{(Equation 4)}$$

As one of ordinary skill in the art will appreciate, the accuracy of reference-level pressures corresponding to reference pressure sensors of a network affects the accuracy of a barometric-based altitude estimate in two ways: (1) determination of the estimated altitude using a reference-level pressure itself, and (2) determination of the estimated altitude using a measurement of pressure from a pressure sensor that was previously calibrated using another reference-level pressure. When a floor-level accuracy is required for an estimated altitude of a mobile device, only small amounts of error in the reference-level pressure can be tolerated since every 10 Pascals of measurement error can result in 1 meter of error in the estimated altitude of the mobile device as compared to the true altitude of the mobile device. It follows that reliable reference-level pressures are needed for sensor calibration and altitude estimation when floor-level altitude accuracy to within 3 meters of error (or preferably 1 meter of error) from true altitude is desired. The network shown in FIG. 1 will produce reliable reference-level pressures that are within a tolerated amount of pressure from true pressure (e.g., <5 Pa), and that are produced at a suitable frequency (e.g., on demand, within seconds, or at another frequency faster than a rate of change of pressure in a coverage area of the network). However, reference-level pressures from networks like that shown in FIG. 1 are not always available. Instead, reference-level pressures may only be available from a different data source, such as a temporally sparse set of weather stations from the National Oceanic and Atmospheric Administration (NOAA) or a regional group of crowdsourced weather stations that can be useful in weather prediction in general, but may not be finely resolved enough for use in navigation or location services that typically require reference-level pressure values with no more than 2 to 5 Pa of error at time intervals of 10 minutes or less. For reference, Table 1 provides typical temporal and pressure value resolutions for different systems that provide reference-level pressure values that could be available under different circumstances.

TABLE 1

Temporal and pressure value resolutions for different systems

| Data Source | Temporal Resolution | Pressure value Resolution |
|---|---|---|
| Calibrated network of reference pressure sensors (e.g., shown in FIG. 1) | 30 sec, or on demand | 1 Pa |
| NOAA weather stations | 1 hour | 1 Pa |
| Crowdsourced weather stations | Varies, but usually ~1 hour | 36 Pa |

When reference-level pressure values from a calibrated network of reference pressure sensors that provide desired temporal and pressure value resolution for use in navigation or location services are not available, only alternative data sources of reference-level pressure values that do not that provide the desired temporal and pressure value resolution for use in navigation or location services may be available for use in estimating an altitude of mobile device or for calibrating a pressure sensor of the mobile device. It follows that solutions for improving the use of less-desirable pressure data when estimating an altitude of a mobile device or calibrating a pressure sensor of a mobile device improving the use of less-desirable data sources of reference-level pressure values (e.g., NOAA or crowdsourced weather stations) when estimating an altitude of a mobile device or calibrating a pressure sensor of a mobile device would be highly valuable. Such solutions are described herein.

DETAILED DESCRIPTION

Estimated altitudes of mobile devices that are accurate to a floor level in a building are highly desired. Floor-level accuracy is possible using a barometric-based location determination system, such as the network of reference pressure sensors 130 shown in FIG. 1. The network of reference pressure sensors 130 produce a reference-level pressure ($P_{ref}$) that is used to estimate an altitude of a mobile device 120 ($h_{mobile}$) as follows:

$$h_{mobile} = h_{ref} - \frac{RT_{remote}}{gM} \ln\left(\frac{P_{ref}}{P_{mobile}}\right), \qquad \text{(Equation 5)}$$

where $P_{mobile}$ is an estimate of pressure at the location of the mobile device 120 by a pressure sensor of the mobile device 120, $T_{remote}$ is an accurate estimate of ambient temperature in the network, $h_{ref}$ is a reference-level altitude, g corresponds to the acceleration due to gravity, R is a gas constant, and M is molar mass of air.

As described in the Background section of this disclosure, the accuracy of reference-level pressures corresponding to the reference pressure sensors 130 affects the accuracy of the estimated altitude ($h_{mobile}$) of the mobile device 120 in two ways: (1) use of the reference-level pressure reference-level pressure ($P_{ref}$) to determine the estimated altitude, and (2) use of a reference-level pressure when calibrating a pressure sensor of the mobile device that provides a measurement of pressure used to determine the estimated altitude. When a floor-level accuracy is required for an estimated altitude of the mobile device 120, only small amounts of error in the reference-level pressure can be tolerated (e.g., <5 Pa, or a greater value that is a fraction of a maximum pressure error corresponding to a tolerated amount of altitude error for floor-level accuracy). It follows that reliable reference-level pressures are desirable for sensor calibration and altitude estimation when floor-level altitude accuracy to within 1-3 meters of altitude error (which corresponds to a maximum pressure error of 10-30 Pa) is needed.

Figure 1:
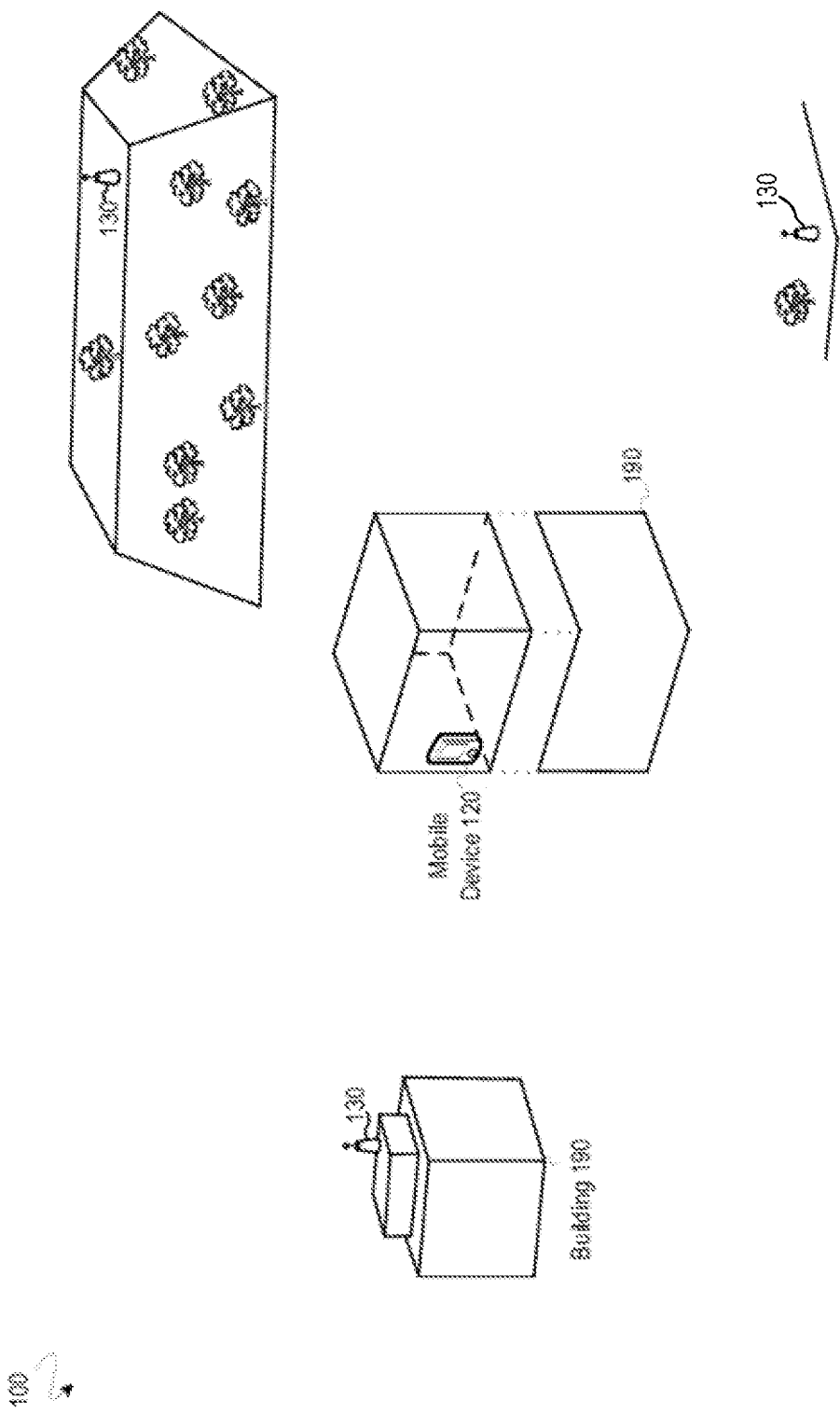
FIG. 1 depicts a network of reference pressure sensors that are used to calibrate a pressure sensor of a mobile device or to estimate an altitude of the mobile device.
Figure 2:
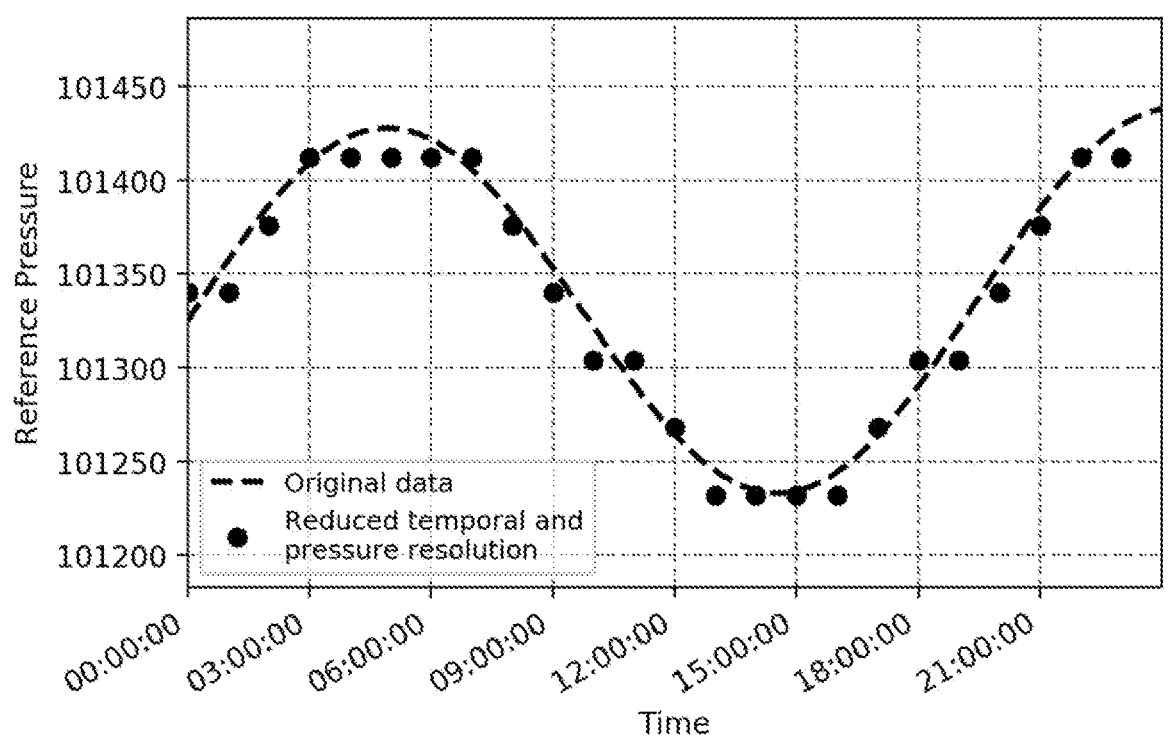
FIG. 2 depicts reference-level pressure values that are determined using a temporally and spatially binned data along with true reference-level pressure values (i.e., "original data") for reference.

When calibrated, the network of reference pressure sensors 130 shown in FIG. 1 offers significant advantages over other systems like NOAA or crowd-sourced weather station systems. Unlike other systems, the network consistently produces pressure measurements used to determine reference-level pressures to within a threshold amount of pressure error from true pressure (e.g., a fraction of a maximum pressure error corresponding to a tolerated amount of altitude error for floor-level accuracy). However, the network can permanently or temporarily have limited coverage area (e.g., due to implementation costs that restrict the size of the network, due to partial outages of the network from time-to-time, or other reasons), which limits when reference-level pressures from the network are available for sensor calibration and altitude estimation. When reference-level pressures from the network are unavailable, pressure data from other sources (e.g., NOAA and/or crowd-source weather station systems) may be available, but the pressure data from other sources may lack the temporal and value resolution needed to produce a suitable reference-level pressure used for calibrating a pressure sensor of the mobile device or estimating an altitude of the mobile device to within tolerated errors. Different approaches for improving the use of available pressure data when estimating an altitude of a mobile device or calibrating a pressure sensor of a mobile device are described below. Each approach obtains one or more reference-level pressure values from a source that measures reference-level pressure values (e.g., a NOAA or crowd-sourced weather station system) and uses the one or more reference-level pressure values to determine an unknown reference-level pressure value for a time at which no reference-level pressure value was obtained from the source of reference-level pressures. Illustrative reference-level pressure values determined using each approach are provided in different figures that are described during discussion of the approaches. The reference-level pressure values illustrated in these figures are determined using the temporally reduced and resolution reduced pressure shown in FIG. 2, which also shows unbinned, high-resolution reference-level pressure values (i.e., "original data") for reference.

Attention is now turned to four approaches for improving the use of available pressure data when estimating an altitude of a mobile device (e.g., using the technique of Equation 5) or calibrating a pressure sensor of a mobile device (e.g., using a technique described in the Background section, or another suitable technique that uses a reference-level pressure value).

In generally, each approach may perform the following steps: determining, at a first time, if a reference-level pressure value based on one or more measurements of pressure from a data source (e.g., a network of weather stations) should or should not be used to calibrate a pressure sensor of a mobile device or to estimate an altitude of the mobile device; if a determination is made that the reference-level pressure value should be used, using the reference-level pressure value to calibrate a pressure sensor of a mobile device or to estimate an altitude of the mobile device; and if the reference-level pressure value should not be used, determining a trend in pressure, determining an estimated reference-level pressure value based on the trend, and using the estimated reference-level pressure value to calibrate the pressure sensor of the mobile device or to estimate the altitude of the mobile device. The type of trend in pressure differs per approach. Also, different approaches for determining that a reference-level pressure value should not be used can be performed—e.g., determining that an elapsed time since the reference-level pressure value was determined (or since the pressure measurements on which it is based were measured) exceeds a first threshold amount of time; e.g., determining that no other reference-level pressure value has been determined (or is based on pressure measurements that were measured) within a second threshold amount of time immediately preceding the first time; e.g., or any other way of determining a reference-level pressure value should not be used due to that reference-level pressure potentially not being reflective of current reference-level pressure at the first time.

First Approach

Figure 3:
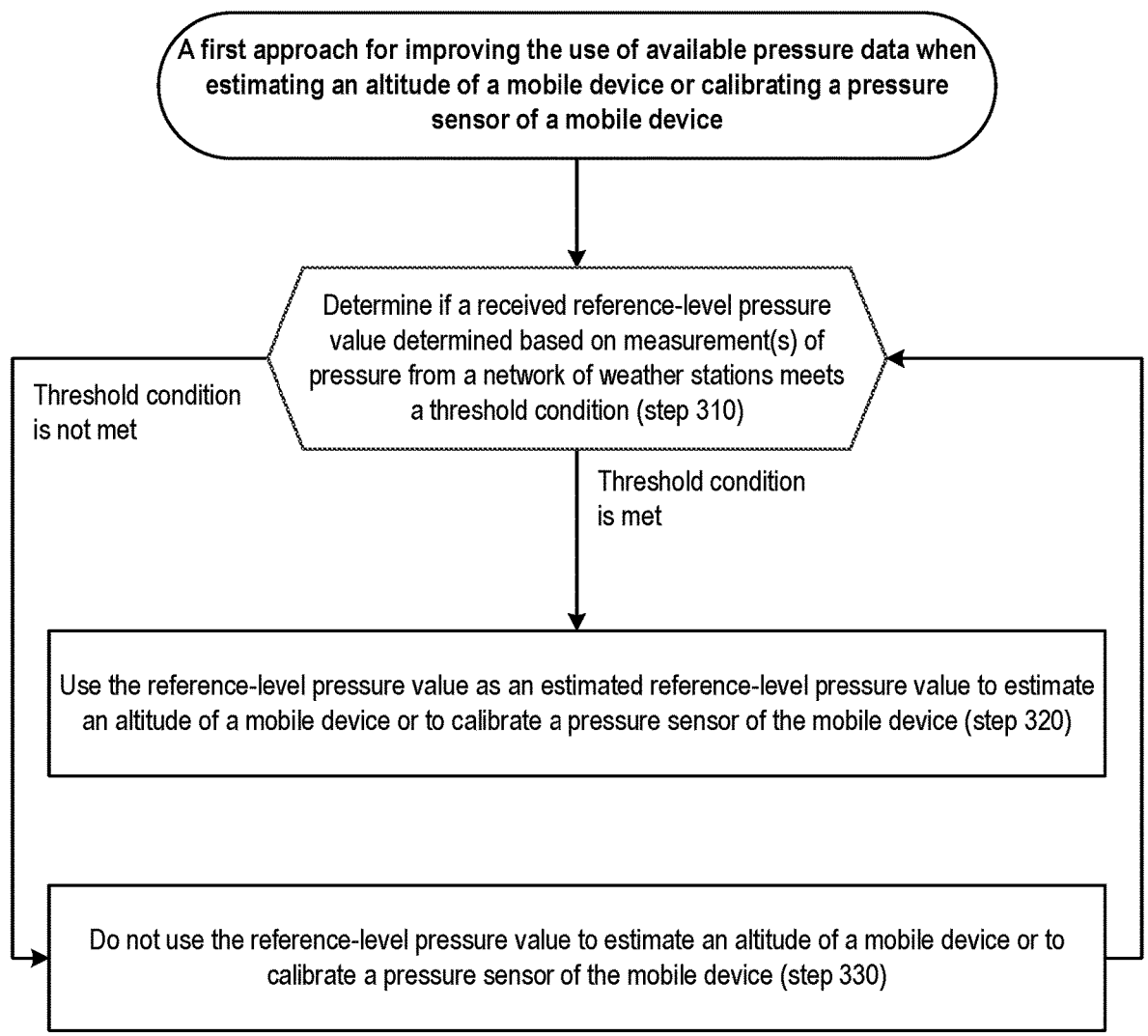
FIG. 3 shows a first approach for improving the use of available pressure data when estimating an altitude of a mobile device or calibrating a pressure sensor of a mobile device by using a reference-level pressure value that meets a threshold condition until a new pressure reference-level pressure value that meets the threshold condition is available.

A first approach for improving the use of available pressure data when estimating an altitude of a mobile device or calibrating a pressure sensor of a mobile device is shown in FIG. 3 and described below. The first approach uses a reference-level pressure value from a network of weather stations that meets a threshold condition as an estimated reference-level pressure value until a new reference-level pressure value from the network that meets the threshold condition is available to use as an estimated reference-level pressure value.

In different embodiments, the process of FIG. 3 is performed using a processor of a mobile device, a server, a combination of a processor of a mobile device and a server, or other suitable machine(s).

As shown in FIG. 3, a determination is made as to whether a received reference-level pressure value that was based on one or more measurements of pressure from a network of weather stations meets a threshold condition (step 310), wherein a temporal resolution of the network of weather stations does not meet a temporal condition (e.g., consecutive reference-level pressures from the network of weather stations are not available within a predefined amount of time, such as 30 seconds or less) and/or a pressure value resolution of the network of weather stations does not meet a pressure value condition (e.g., reference-level pressures from the network of weather stations are within a predefined amount of pressure from true pressure at the reference-level altitude, such as 5 Pa or less). Examples of meeting a threshold condition during step 310 include: confirming that the reference-level pressure value was determined from pressure data measured by a managed network of weather stations, such as NOAA, or a crowdsourced network of weather stations that pass a quality check. In one embodiment, a crowdsourced network of weather stations pass a quality check when the reference-level pressure value from that network is an adjusted reference pressure determined using one of the processes for computing an adjusted reference pressure described in U.S. patent application Ser. No. 15/676,454, filed on Aug. 14, 2017, entitled SYSTEMS AND METHODS FOR DETERMINING A REFERENCE PRESSURE FOR USE IN ESTIMATING AN ALTITUDE OF A MOBILE DEVICE, which is published under U.S. Pat. Pub. No. 2018/0252521 (published on Sep. 6, 2018). In another embodiment, a crowdsourced network of weather stations pass a quality check when the reference-level pressure value from that network is an initial reference pressure or a new reference pressure determined using the temperature monitoring process described in U.S. patent application Ser. No. 15/683,513, filed on Aug. 22, 2017, entitled SYSTEMS AND METHODS FOR ESTIMATING AN ALTITUDE OF A MOBILE DEVICE BASED ON DETECTED TEMPERATURE CONDITIONS, which is published under U.S. Pat. Pub. No. 2018/0252522 (published on Sep. 6, 2018).

If the reference-level pressure value meets the threshold condition, the reference-level pressure value is used as an estimated reference-level pressure value to estimate an altitude of a mobile device or to calibrate a pressure sensor of the mobile device (step 320).

If the reference-level pressure value does not meet the threshold condition, the reference-level pressure value is not used to estimate an altitude of a mobile device or to calibrate a pressure sensor of the mobile device (step 330), and the process returns to step 310 when a new reference-level pressure value is determined from the network of weather stations.

In a first embodiment of the first approach, the most-recent reference-level pressure value from the network that meets the threshold condition is used as an estimated reference-level pressure value until a new reference-level pressure value from the network that meets the threshold condition is available. In a second embodiment of the first approach, the most-recent reference-level pressure value that meets the threshold condition is used as an estimated reference-level pressure value for the shorter of a threshold amount of time (e.g., 1 hour or less) or until a new reference-level pressure value from the network that meets the threshold condition is available.

Figure 4:
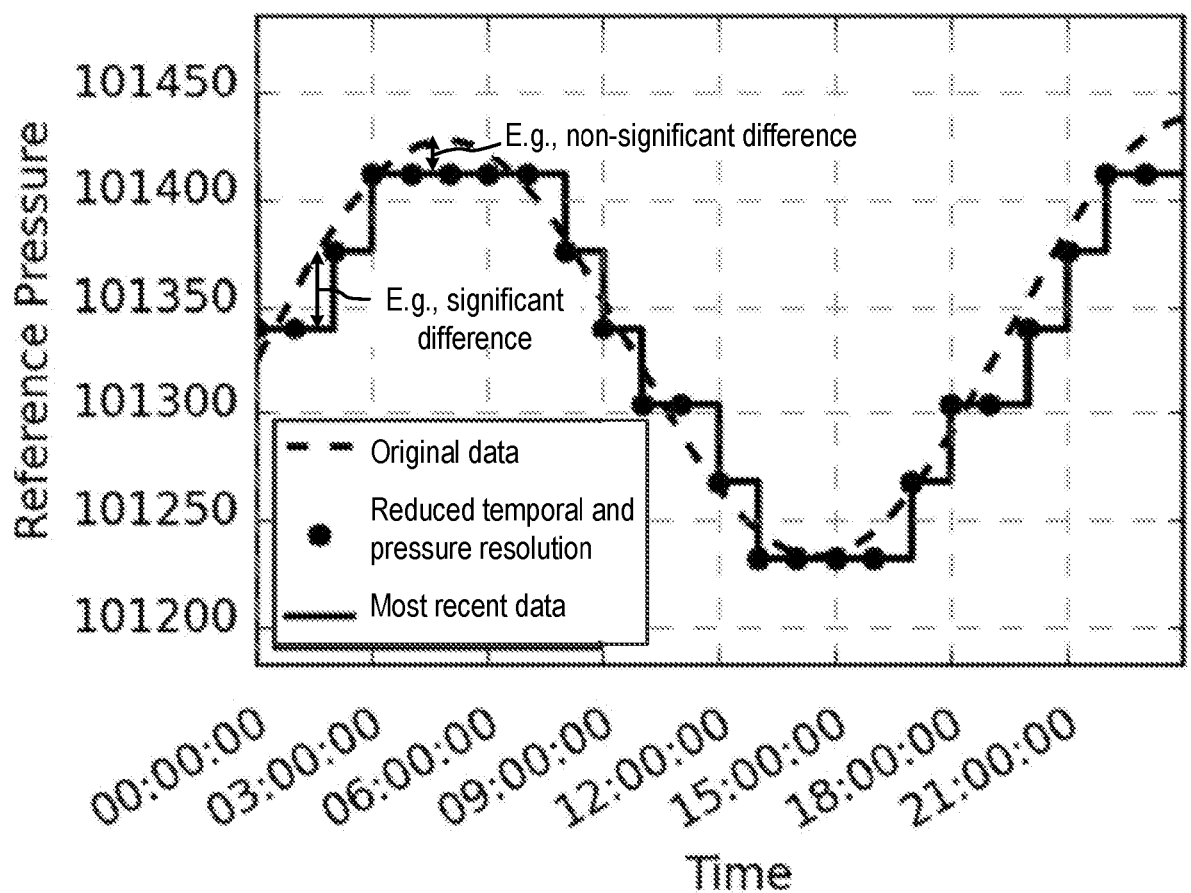
FIG. 4 depicts temporal use of reference-level pressure values during one embodiment of the first approach.

By way of example, FIG. 4 depicts temporal use of previous reference-level pressure values as estimated reference-level pressure values during one embodiment of the first approach. As depicted by the "most recent data" pressure values, the difference between some estimated reference-level pressure values and the true pressure for particular times may be significant (e.g., exceeding a threshold amount of pressure associated with a maximum altitude error, such as 10 Pa per each meter of tolerated altitude error, or a maximum calibration error, such as 2-5 Pa), but not significant at another time (e.g., not exceeding the tolerated amount of pressure). Thus, the first approach can be useful so long as the time period between usable reference-level pressure values (i.e., reference-level pressure values received from the network that meet the threshold condition) does not exceed a typical amount of time over which pressure can change in excess of a threshold amount of pressure associated with a maximum altitude error or a maximum calibration error. By way of example, different amounts of time over which pressure can change in excess of 10 Pa include 5 minutes, 15 minutes and 30 minutes. However, pressure will not always change by 10 Pa during this typical amount of time. Therefore, it would be beneficial to understand a trend in changing reference-level pressures received from a network, which is determined in second, third, and fourth approaches discussed below.

Second Approach

Figure 5:
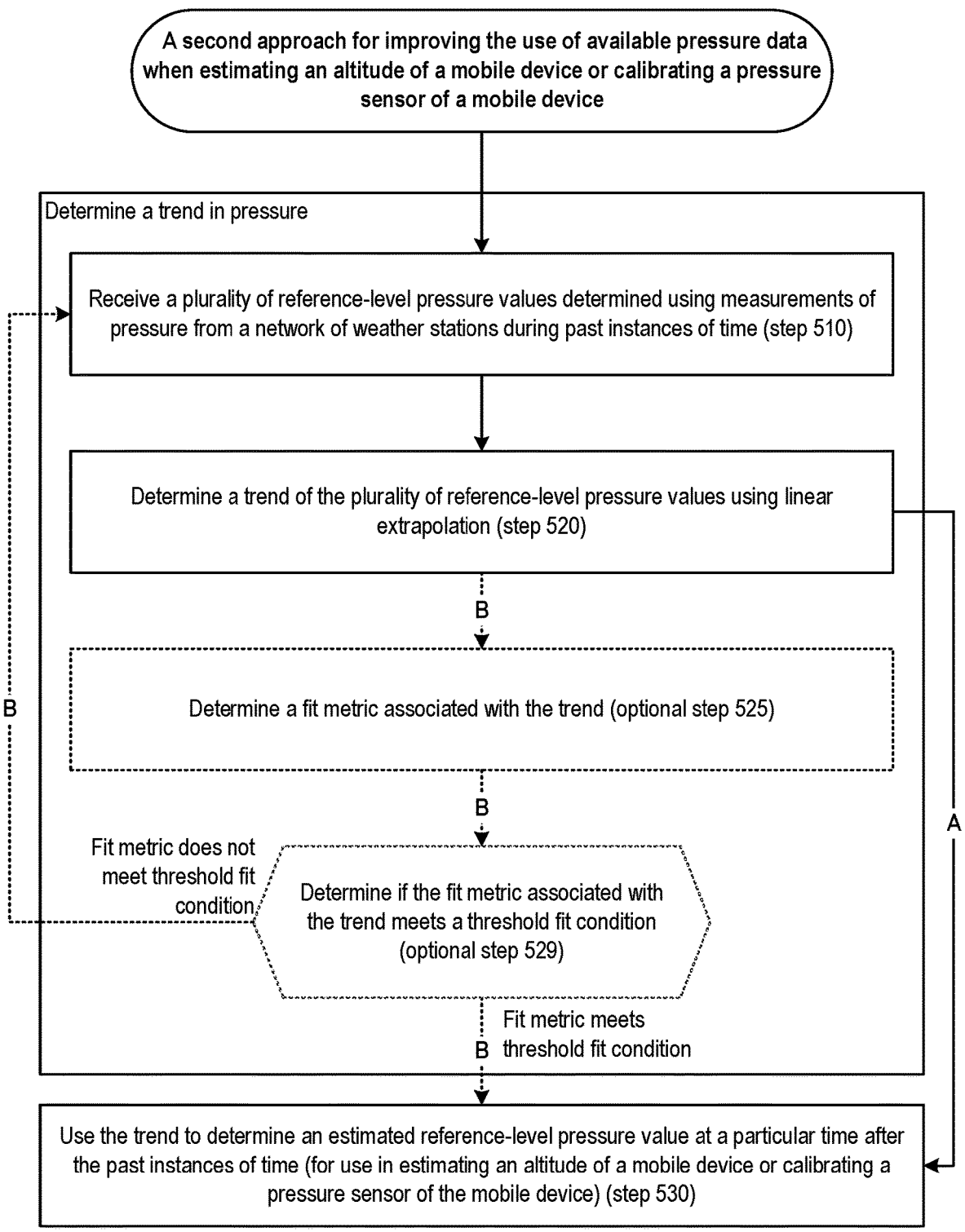
FIG. 5 shows a second approach for improving the use of available pressure data when estimating an altitude of a mobile device or calibrating a pressure sensor of a mobile device by linearly extrapolating estimated reference-level pressure values based upon n reference-level pressure values previously-received from a network.

A second approach for improving the use of available pressure data when estimating an altitude of a mobile device or calibrating a pressure sensor of a mobile device is shown in FIG. 5 and described below. The second approach linearly extrapolates estimated reference-level pressure values based upon n (e.g., n=2 or 3) reference-level pressure values previously-received from a network of weather stations. In one embodiment, a temporal resolution of the network of weather stations does not meet a temporal condition (e.g., consecutive reference-level pressures from the network of weather stations are not available within a predefined amount of time, such as 30 seconds or less) and/or a pressure value resolution of the network of weather stations does not meet a pressure value condition (e.g., reference-level pressures from the network of weather stations are within a predefined amount of pressure from true pressure at the reference-level altitude, such as 5 Pa or less). However, the second approach can be used to estimate reference-level pressure values for a calibrated network of reference pressure sensor (e.g., the network shown in FIG. 1), which has a temporal resolution that meets the temporal condition and a pressure value resolution that meets the pressure value condition.

In one embodiment of the second approach, each extrapolated value is not rounded to the resolution of the previously-determined reference-level pressure values received from the network, and instead rounded to a smaller value—e.g., if previously-reference-level pressure values have a resolution of 36 Pa, the computed extrapolated value can be rounded to less than 36 Pa (e.g., a desired resolution, such as 1 Pa, or a maximum amount of error such as 5 Pa or 10 Pa).

In different embodiments, the process of FIG. 5 is performed using a processor of a mobile device, a server, a combination of a processor of a mobile device and a server, or other suitable machine(s).

As shown in FIG. 5, a plurality of reference-level pressure values determined using measured pressures from a network of weather stations during past instances of time are received (step 510). By way of example, the plurality of reference-level pressure values may include two or three reference-level pressure values.

A trend of the plurality of reference-level pressure values is determined (step 520). In one embodiment, the trend is represented by a line (A*x+B), which passes through each of the plurality reference-level pressure values when there are only two reference-level pressure values, or which is mathematically fit to the plurality of reference-level pressure values using known fitting techniques when there are more than two reference-level pressure values.

The determined trend is used to determine one or more estimated reference-level pressure values along the trend for use in estimating an altitude of a mobile device or calibrating a pressure sensor of the mobile device at different times after the past instances of time until another reference-level pressure value from the data source is received (step 530). In one embodiment of step 530, when the trend is represented by a line, different estimated reference-level pressure values along the line are determined for different times after the most-recent reference-level pressure value of the plurality of reference-level pressure values was determined—e.g., a first reference-level pressure value on the line corresponding to a first time since the most-recent reference-level pressure value was determined, a second reference-level pressure value on the line corresponding to a second time since the most-recent reference-level pressure value was determined, . . . , and an Nth reference-level pressure value on the line corresponding to an Nth time since the most-recent reference-level pressure value was determined. A reference-level pressure value on the line may be determined by identifying a current time, and then identifying a value of a point on the line for that time.

One embodiment of FIG. 5 includes a step of determining if a received reference-level pressure value should or should not be used for sensor calibration or altitude estimation in relation to a mobile device before step 520 is performed. If a received reference-level pressure value should be used, then steps 520 through 530 are not performed, and sensor calibration or altitude estimation occurs using the received reference-level pressure value. If a reference-level pressure value should not be used, then steps 520 through 530 are performed. Another embodiment of FIG. 5 includes a step of determining if a received reference-level pressure value should or should not be used for sensor calibration or altitude estimation in relation to a mobile device before step 530 is performed. If a reference-level pressure value should be used, then step 530 is not performed, and sensor calibration or altitude estimation occurs using the received reference-level pressure value. If a reference-level pressure value should not be used, then step 530 is performed.

Figure 6A:
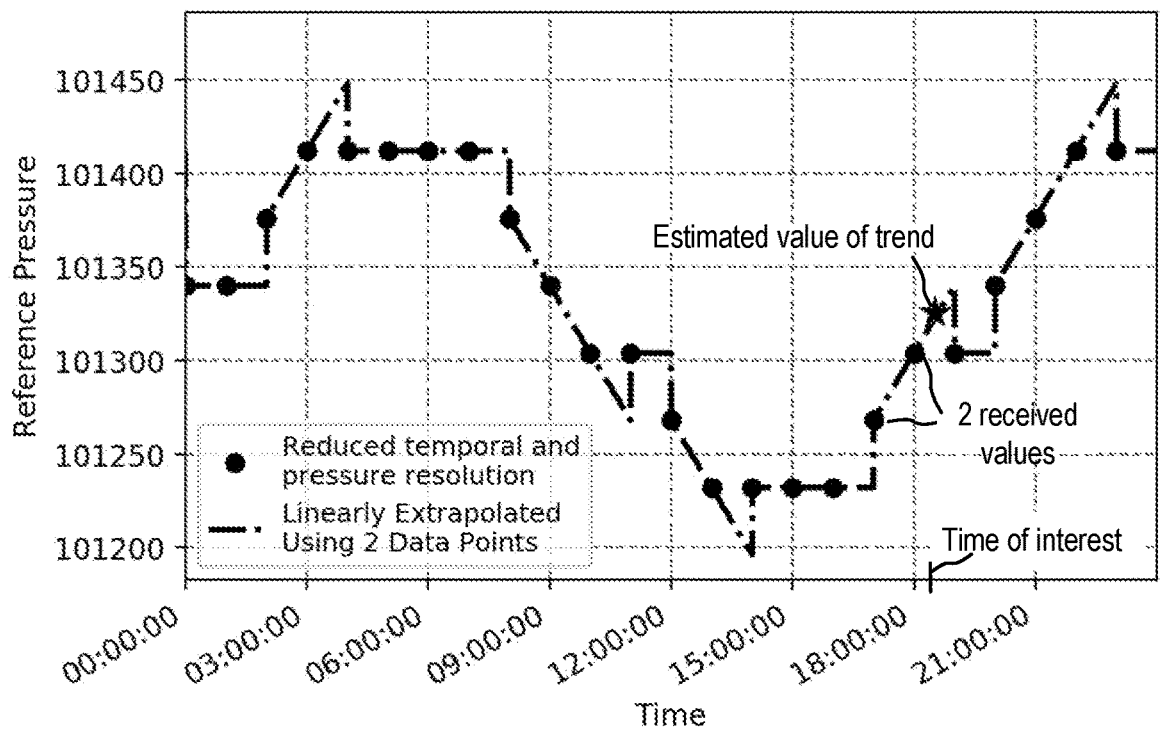
FIG. 6A illustrates pressure trends determined using the second approach with two consecutively-received reference-level pressure values.
Figure 6B:
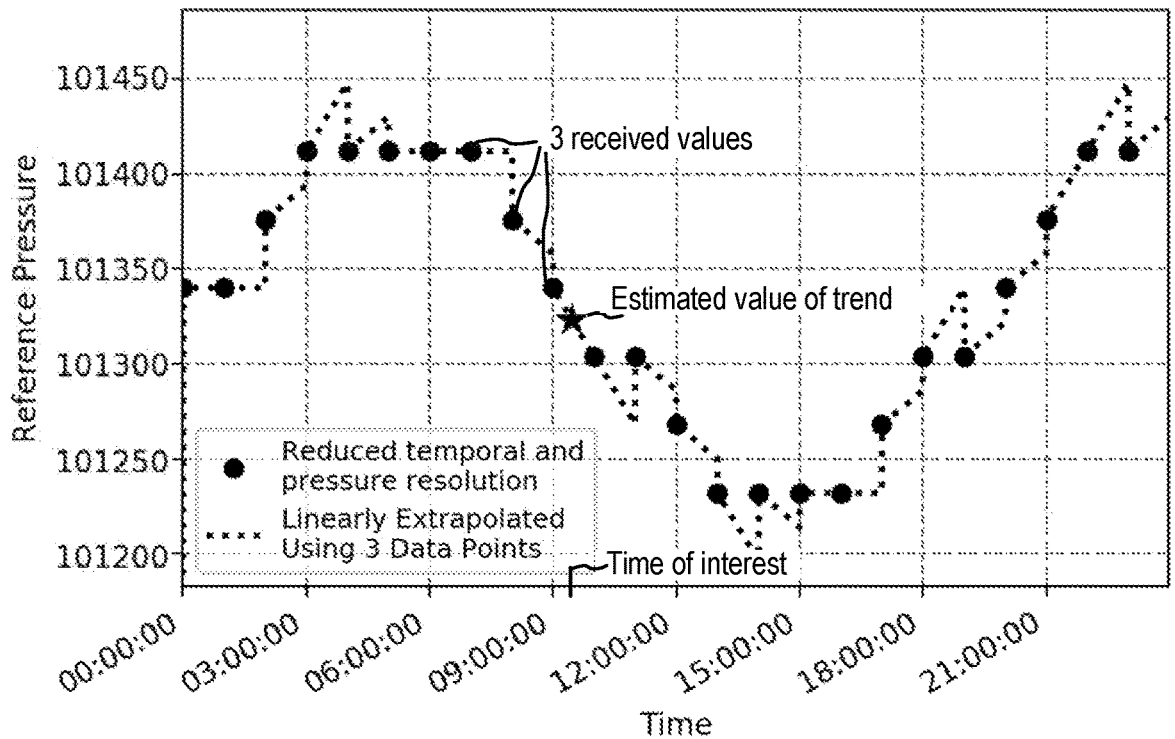
FIG. 6B illustrates pressure trends determined using the second approach with three consecutively-received reference-level pressure values.

By way of example, FIG. 6A illustrates pressure trends (e.g., linearly extrapolated lines of estimated pressure values) determined using two consecutive reference-level pressure values received from a network of weather stations, and FIG. 6B illustrates pressure trends (e.g., extrapolated lines of estimated pressure values) determined using three consecutive reference-level pressure values from the network. For purposes of illustration in each of FIG. 6A and FIG. 6B, reference-level pressure values received from the network for different times and an estimated reference-level pressure value along the determined trend at a time of interest are identified.

When the plurality of reference-level pressure values includes more than two reference-level pressure values, additional steps may be performed in some but not all embodiments after step 520 to assess if the determined trend from step 520 produces reliable estimated reference-level pressure values for times after the most-recent reference-level pressure value from the plurality of reference-level pressure values was initially received. In one embodiment, a fit metric associated with the trend is determined (step 525), and a determination is made to determine if the fit metric meets a threshold fit condition (step 529) before the process (i) proceeds to step 530 if the fit metric meets the threshold fit condition or (ii) does not proceed to step 530 if the fit metric does not meet the threshold fit condition, and may instead return to step 510 for a new time, or may lead to a step of waiting for a new reference-level pressure value and a determination that the new reference-level pressure should be used for sensor calibration or altitude estimation. In one embodiment, the fit metric is a normalized sum of residuals, and the threshold condition is met when the sum of the residuals is below a threshold residual value (e.g., 10 Pa). In another embodiment of the additional step, the fit metric is a coefficient of a determined $R^2$ value, and the threshold condition is met when the coefficient is above a threshold coefficient value (e.g., 0.5).

Third Approach

Figure 7:
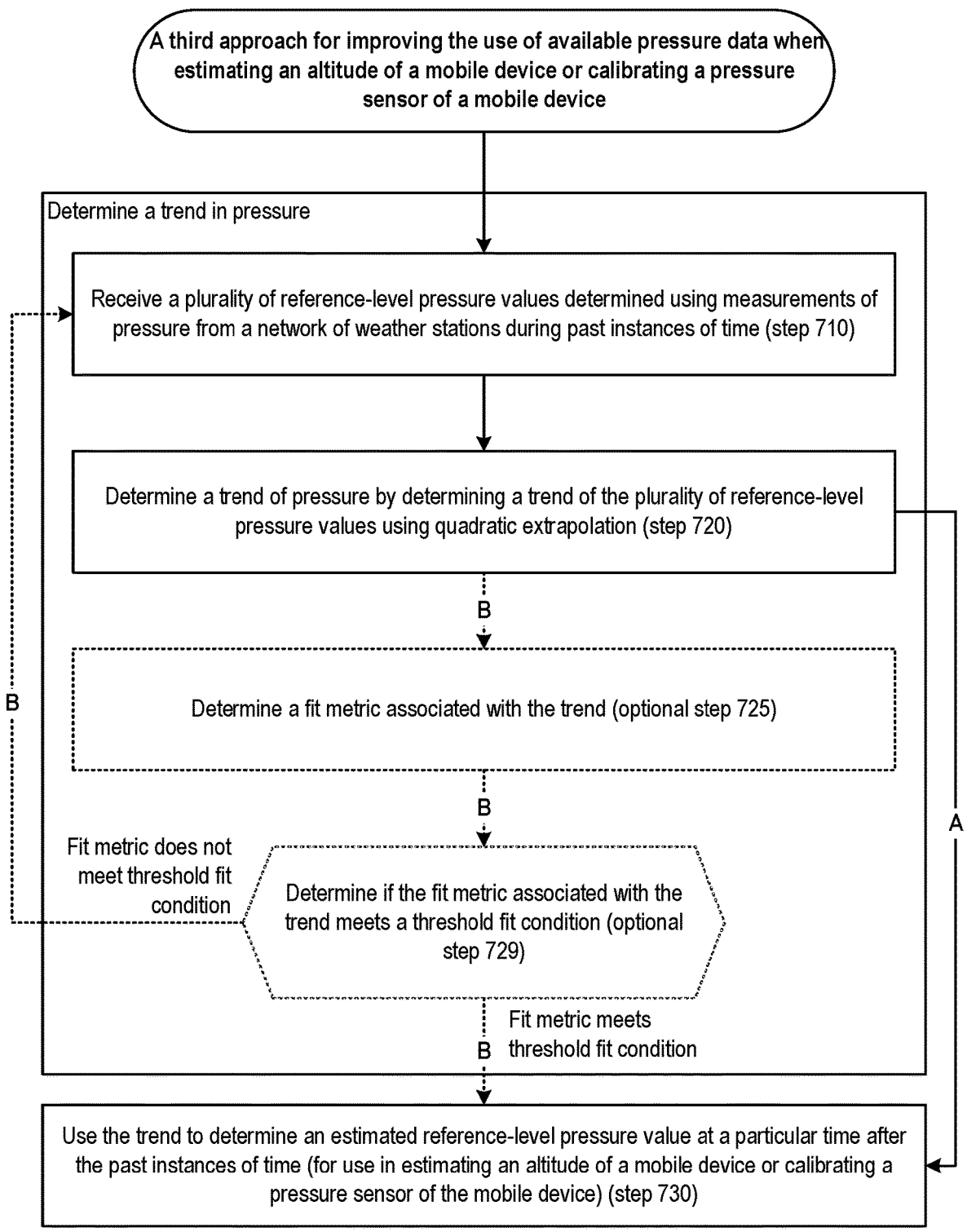
FIG. 7 shows a third approach for improving the use of available pressure data when estimating an altitude of a mobile device or calibrating a pressure sensor of a mobile device by quadratically extrapolating estimated reference-level pressure values based upon n reference-level pressure values previously-received from a network.

A third approach for improving the use of available pressure data when estimating an altitude of a mobile device or calibrating a pressure sensor of a mobile device is shown in FIG. 7 and described below. The third approach quadratically extrapolates estimated reference-level pressure values based upon n (e.g., n=3, 4, 5, 6, or more) reference-level pressure values previously-received from a network of weather stations. In one embodiment, a temporal resolution of the network of weather stations does not meet a temporal condition (e.g., consecutive reference-level pressures from the network of weather stations are not available within a predefined amount of time, such as 30 seconds or less) and/or a pressure value resolution of the network of weather stations does not meet a pressure value condition (e.g., reference-level pressures from the network of weather stations are within a predefined amount of pressure from true pressure at the reference-level altitude, such as 5 Pa or less). However, the third approach can be used to estimate reference-level pressure values for a calibrated network of reference pressure sensors (e.g., the network shown in FIG. 1), which has a temporal resolution that meets the temporal condition and a pressure value resolution that meets the pressure value condition.

In one embodiment of the third approach, each extrapolated value is not rounded to the resolution of the previously-determined reference-level pressure values received from the network, and instead rounded to a smaller value—e.g., if previously-reference-level pressure values have a resolution of 36 Pa, the computed extrapolated value can be rounded to less than 36 Pa (e.g., a desired resolution, such as 1 Pa, or a maximum amount of error such as 5 Pa or 10 Pa).

In different embodiments, the process of FIG. 7 is performed using a processor of a mobile device, a server, a combination of a processor of a mobile device and a server, or other suitable machine(s).

As shown in FIG. 7, a plurality of reference-level pressure values determined using measurements of pressures from a network of weather stations during past instances of time are received (step 710). By way of example, the plurality of reference-level pressure values may include three or more reference-level pressure values.

A trend of the plurality of reference-level pressure values is determined (step 720). In one embodiment, the trend is represented by a curve ($A*x^2+B*x+C$), which is mathematically fit to the plurality of reference-level pressure values using known fitting techniques.

The determined trend is used to determine one or more estimated reference-level pressure values along the trend for use in estimating an altitude of a mobile device or calibrating a pressure sensor of the mobile device at different times after the past instances of time until another reference-level pressure value from the data source is received (step 730). In one embodiment of step 730, when the trend is represented by a curve, different estimated reference-level pressure values along the curve are determined for different times after the most-recent reference-level pressure value of the plurality of reference-level pressure values was determined—e.g., a first reference-level pressure value on the curve corresponding to a first time since the most-recent reference-level pressure value was determined, a second reference-level pressure value on the curve corresponding to a second time since the most-recent reference-level pressure value was determined, . . . , and an Nth reference-level pressure value on the curve corresponding to an Nth time since the most-recent reference-level pressure value was determined. A reference-level pressure value on the curve may be determined by identifying a current time, and then identifying a value of a point on the line for that time.

One embodiment of FIG. 7 includes a step of determining if a received reference-level pressure value should or should not be used for sensor calibration or altitude estimation in relation to a mobile device before step 720 is performed. If a received reference-level pressure value should be used, then steps 720 through 730 are not performed, and sensor calibration or altitude estimation occurs using the received reference-level pressure value. If a reference-level pressure value should not be used, then steps 720 through 730 are performed. Another embodiment of FIG. 7 includes a step of determining if a received reference-level pressure value should or should not be used for sensor calibration or altitude estimation in relation to a mobile device before step 730 is performed. If a reference-level pressure value should be used, then step 730 is not performed, and sensor calibration or altitude estimation occurs using the received reference-level pressure value. If a reference-level pressure value should not be used, then step 730 is performed.

Figure 8:
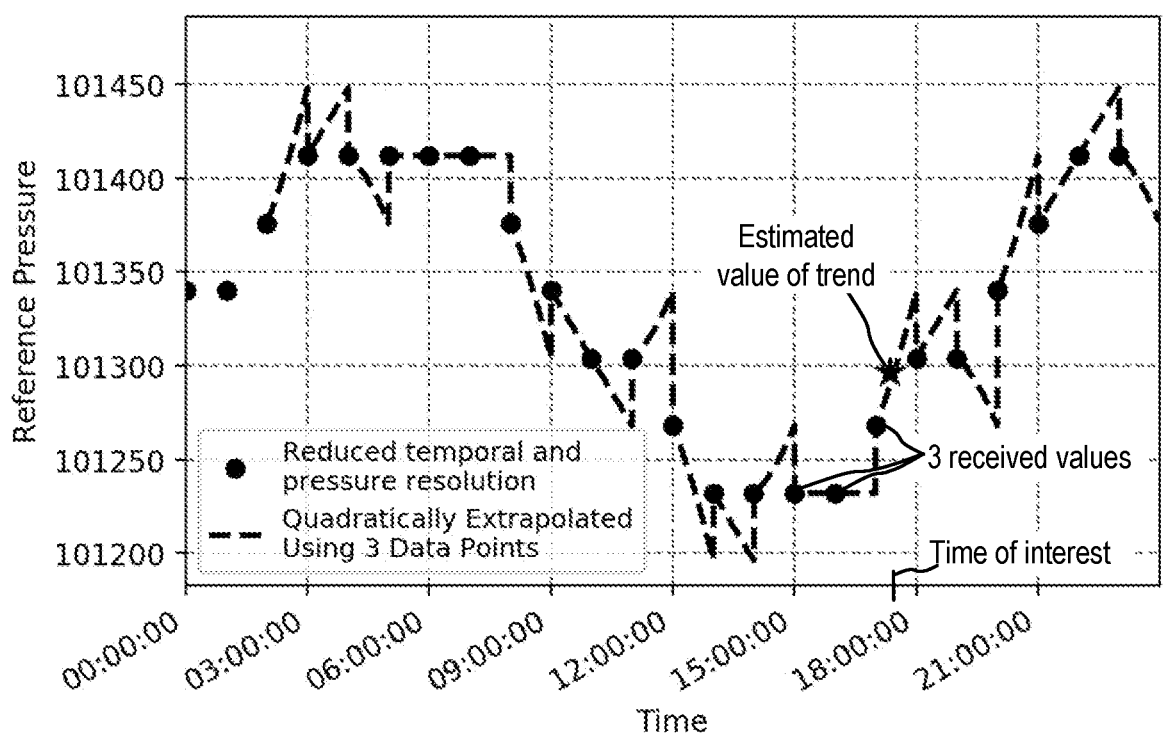
FIG. 8 illustrates pressure trends determined using the third approach with three consecutively-received reference-level pressure values.

By way of example, FIG. 8 illustrates pressure trends (e.g., quadratically extrapolated curves of estimated pressure values) determined using three consecutive reference-level pressure values received from a network of weather stations. For purposes of illustration in FIG. 8, reference-level pressure values received from the network and an estimated reference-level pressure value along the determined trend at a time of interest are identified.

When the plurality of reference-level pressure values includes more than two reference-level pressure values, additional steps may be performed in some but not all embodiments after step 720 to assess if the determined trend from step 720 produces reliable estimated reference-level pressure values for times after the most-recent reference-level pressure value from the plurality of reference-level pressure values was initially received. In one embodiment, a fit metric associated with the trend is determined (step 725), and a determination is made to determine if the fit metric meets a threshold fit condition (step 729) before the process (i) proceeds to step 730 if the fit metric meets the threshold fit condition or (ii) does not proceed to step 730 if the fit metric does not meet the threshold fit condition, and may instead return to step 710 for a new time, or may lead to a step of waiting for a new reference-level pressure value and a determination that the new reference-level pressure should be used for sensor calibration or altitude estimation. In one embodiment, the fit metric is a normalized sum of residuals, and the threshold condition is met when the sum of the residuals is below a threshold residual value (e.g., 10 Pa). In another embodiment of the additional step, the fit metric is a coefficient of a determined $R^2$ value, and the threshold condition is met when the coefficient is above a threshold coefficient value (e.g., 0.5).

Fourth Approach

Figure 9:
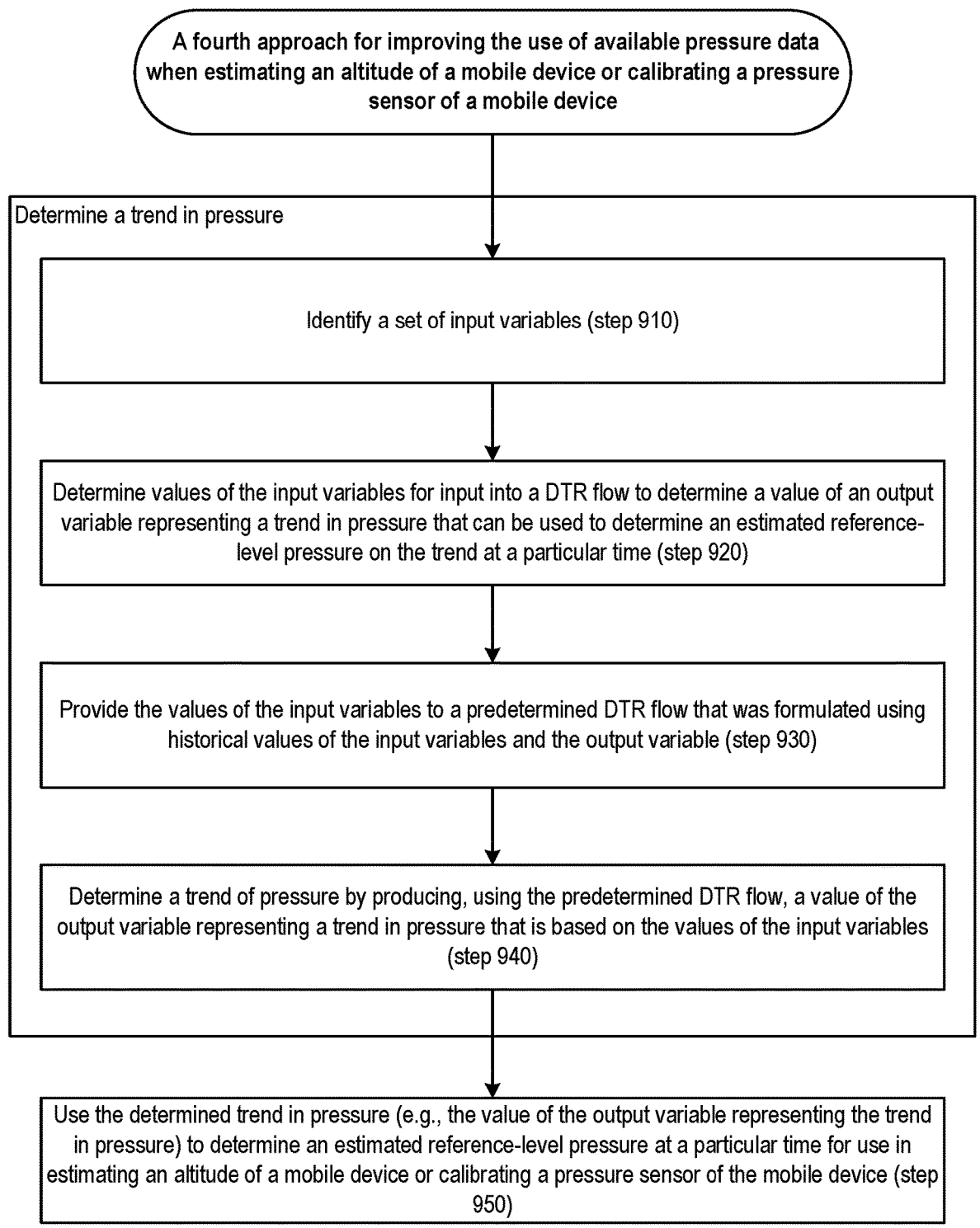
FIG. 9 shows a fourth approach for improving the use of available pressure data when estimating an altitude of a mobile device or calibrating a pressure sensor of a mobile device by using a decision tree regression with different inputs.

A fourth approach for improving the use of available pressure data when estimating an altitude of a mobile device or calibrating a pressure sensor of a mobile device is shown in FIG. 9 and described below. The fourth approach uses decision tree regression (DTR) to approximate the temporal variation of pressure values using different combinations of inputs that may include: a measurement of ambient temperature from a network of weather stations; a temperature trend (e.g., change) of measurements of temperature received over time from the network of weather stations (e.g., over 1 hour); a pressure trend (e.g., change) of pressure values received over time from the network of weather stations (e.g., over 1 hour); a time of day; and/or a month of year. Use of a decision tree regression to approximate a trend is beneficial over other approaches when the shape (i.e. linear, sinusoidal, other) of an underlying distribution of reference-level pressure values is not known a priori.

In general, DTR takes historical values of input variables and the output variable and constructs a decision flow chart with various thresholds that define conditions values of the input variables must meet to produce the output variable. By way of example, if historical input data for a particular month (e.g., October) and a particular time period during days of the month (e.g., between 1 PM and 4 PM) indicates that pressure variation over a predefined period of time (e.g., 1 hour) is a particular amount of variation (e.g., 10 Pa/hr on average) when (i) the temperature at the beginning of the predefined time period is cold (10 to 15 Celsius), (ii) temperature variation at the beginning of the predefined time period is low (e.g., less than 1 degree of Celsius change in the hour prior to the start of the predefined period of time), then a decision tree regression flow can determine that a trend in pressure for 3:45 PM on a current day in October is 10 Pa/hr when the most-recent measurement of temperature is 11.5 Celsius and a temperature variation between n (e.g., n=2) most-recent measurements of temperature is <1 degree/hour. The trend in pressure can be plotted from the most-recent received reference-level pressure and used to determine an estimated reference-level pressure for a time along the plotted trend in pressure.

In different embodiments, the process of FIG. 9 is performed using a processor of a mobile device, a server, a combination of a processor of a mobile device and a server, or other suitable machine(s).

One embodiment of the fourth approach is shown in FIG. 9. A set of input variables are identified (step 910), and values of the input variables are determined for input into a DTR flow to determine a value of an output variable representing a trend in pressure that can be used to determine an estimated reference-level pressure on the trend at a particular time (step 920). By way of example, values of input variables in the set may include: (1) the most-recently measured temperature (e.g., measured in Celsius); (2) a measured temperature trend over a predefined time period (e.g., a change in temperature between the two most recently-measured temperatures); (3) a time of day (e.g., an hour:minute measurement like 1:00 AM, 2:17 AM, other); and (4) a measured pressure trend over the predefined time period (e.g., a change in pressure between the two most recently-received reference-level pressures).

The values of the input variables are provided to a predetermined DTR flow that was formulated using known techniques of DTR and historical values of the input variables and the output variable (step 930).

A value of the output variable representing a trend in pressure is produced by the predetermined DTR flow based on the values of the input variables (step 940). In one embodiment of step 940, the value of the output variable is determined based on a relationship of each value of each input variable and one or more threshold conditions for that input variable. For example, if (i) the value of the measured pressure trend (e.g., 5 Pa/hr) has a predefined pressure trend relationship with a first pressure trend threshold (e.g., is less than the 10 Pa/hr threshold), (ii) the value of the measured temperature trend (e.g., 0.8 Celsius/hr) has a predefined temperature trend relationship with a first temperature trend threshold (e.g., is less than the 1 Celsius/hr threshold), and the most-recently measured temperature has a predefined temperature relationship with a first temperature threshold (e.g., is greater than the 18 Celsius threshold), then the value of the output variable representing the trend in pressure after the time of day is a predetermined value associated with the particular combination of the predefined relationships (e.g., 12 Pa/hr). Alternatively, the value of the output variable representing the trend in pressure after the time of day is a different predetermined value when values of input variables have a different combination of predefined relationships with respective thresholds.

The value of the output variable representing a trend in pressure is used to determine an estimated reference-level pressure for a particular time (step 950). In one embodiment of step 950, the estimated reference-level pressure for the particular time equals the most-recently received reference-level pressure value adjusted by the value of the pressure trend multiplied by an amount of time between the time when the reference-level pressure value was determined (e.g., based on a time stamp of the pressure value) and the particular time—e.g., 12 Pa+(10 Pa/hr)*(0.75 hr)=19.5 Pa estimated reference-level pressure value.

A DTR flow may be predetermined using known techniques. In a simplified example, the predetermined DTR flow may be trained using a measured ambient temperature at 1 AM of 10 Celsius, a measured temperature trend between 12 AM and 1 AM of −0.5 Celsius/hr, a measured pressure trend between 12 AM and 1 AM of +15 Pa/hr, and a measured pressure trend between 1 AM and 2 AM is +10 Pa/hr. In this case, the four input variables (and historical values thereof) are time of day (e.g., 1 AM), ambient temperature at the time of day (e.g., 10 Celsius), a temperature trend at the time of day (e.g., −0.5 Celsius/hr), and a pressure trend at the time of day (e.g., +15 Pa/hr). The output variable (and historical value thereof) is a pressure trend after the time of day (e.g., +10 Pa/hr). Using a well-known DTR technique will use the historical input variable values to determine input variable thresholds that, if met, produce a particular value of the output variable. For instance, when the time of day is 1 AM, the most recent measured temperature is less than 20 Celsius, the most recent measured temperature trend is less than −0.25 Celsius/hr, and the most-recent measured pressure trend is greater than 10 Pa/hr, then a value of the output variable (e.g., expected pressure trend following the time of day) is +10 Pa/hour. Training a particular DTR flow will use more than 1 set of data used by the simplified example provided above to holistically determine an optimal decision flow (e.g., threshold conditions) to arrive at a predicted value of the output variable representing the forward-looking pressure trend.

Other embodiments of the fourth approach use less than four input variables but may produce less accurate values of output variables. For example, the following sets of input variables can be used: (1) a pressure trend between two most-recent received reference-level pressures, a most-recent measured temperature, and a time of day; (2) a pressure trend between two most-recent received reference-level pressures, a most-recent measured temperature, and a temperature trend between two most-recent measured temperatures; and (3) a pressure trend between two most-recent received reference-level pressures, a time of day, and a temperature trend between two most-recent measured temperatures. In other embodiments, an input variable representing a trend can be represented by a "quality" like "Decreasing", "Stable", or "Increasing", or a group of values like >10 Pa/hour, between −10 Pa/hr and +10 Pa/hour, and <−10 Pa/hour.

One embodiment of FIG. 9 includes a step of determining if a received reference-level pressure value should or should not be used for sensor calibration or altitude estimation in relation to a mobile device before step 910 is performed. If a received reference-level pressure value should be used, then steps 910 through 950 are not performed, and sensor calibration or altitude estimation occurs using the received reference-level pressure value. If a reference-level pressure value should not be used, then steps 910 through 950 are performed.

Figure 10:
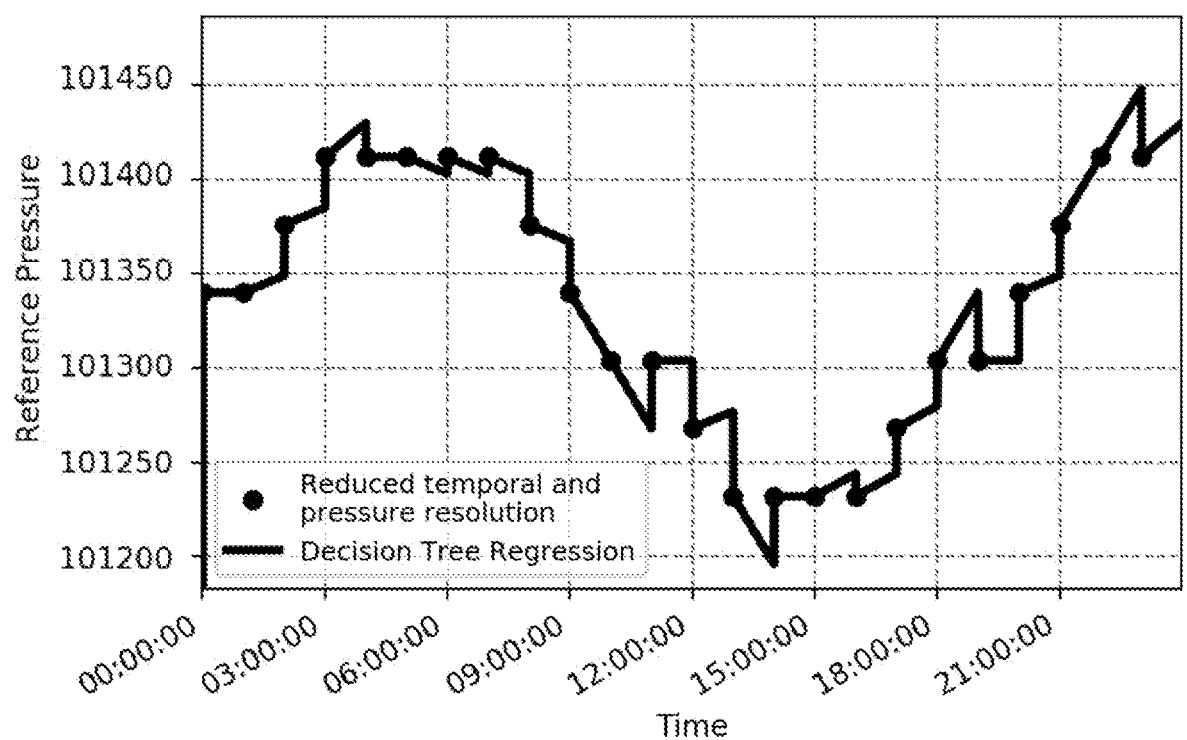
FIG. 10 illustrates pressure trends determined using the fourth approach.

By way of example, FIG. 10 illustrates pressure trends determined using a decision tree regression flow.

Comparison of Different Approaches

Figure 11:
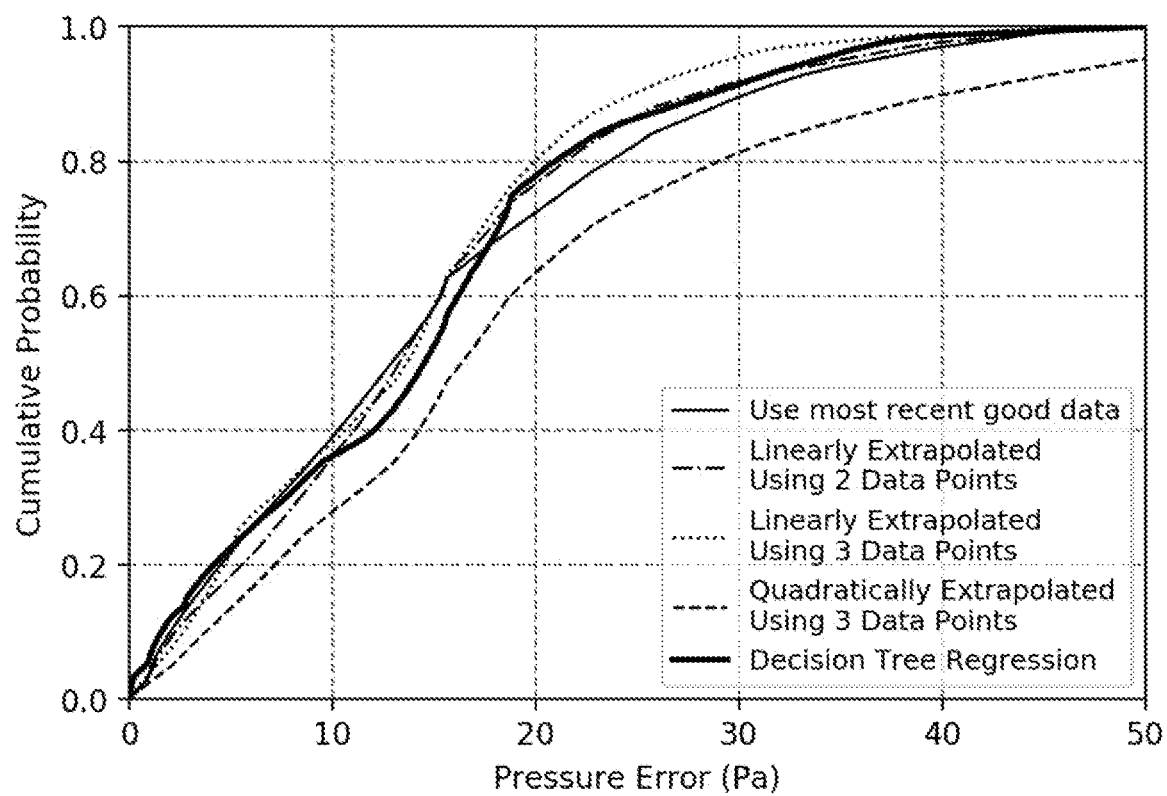
FIG. 11 shows a comparison of performances by the four approaches in terms of pressure error from unbinned, high-resolution pressure data.

By way of example, FIG. 11 shows a comparison of performances by the four approaches in terms of pressure error from actual pressures. As can be seen, the third approach of quadratic extrapolation using three reference-level pressure values ("Quadratically Extrapolated Using 3 Data Points") provides the worst performance in terms of pressure error. The second approach of linear regression using two reference-level pressure values ("Linearly Extrapolated Using 2 Data Points") and three reference-level pressure values ("Linearly Extrapolated Using 3 Data Points"), and also the fourth approach of decision tree regression ("Decision Tree Regression") provide for a larger number of smaller pressure errors than the first approach (e.g., using the most-recent reference-level pressure value), such as for a cumulative probability of 0.8. When the cumulative probability approaches 1.0, the second approach of linear extrapolation using three reference-level pressure values ("Linearly Extrapolated Using 3 Data Points") provides the best opportunity for maximizing the number of reference-level pressure values with a pressure error of less than 30 Pa, which relates to approximately less than 3 meters of altitude error in an estimated altitude.

Selection from Among Different Approaches

Any number of the approaches described herein may be considered for use in estimating an altitude of a mobile device or calibrating a pressure sensor of the mobile device. In some embodiments, one approach is selected from among a group of approaches. A process for selecting an approach from among different approaches that improve the use of available pressure data when estimating an altitude of a mobile device or calibrating a pressure sensor of a mobile device is shown in FIG. 12 and described below.

Figure 12:
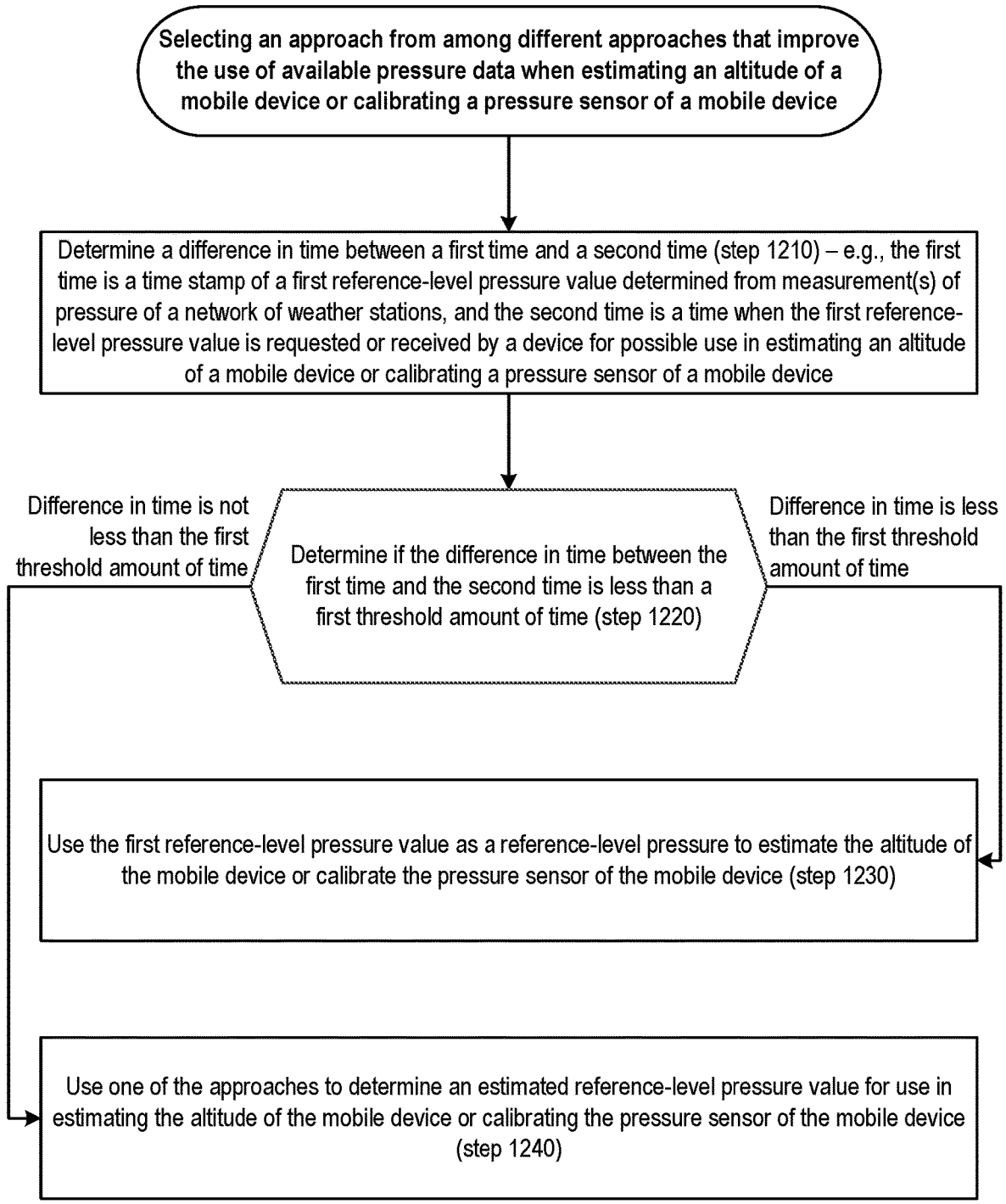
FIG. 12 shows an approach for selecting from among different approaches that improve the use of available pressure data when estimating an altitude of a mobile device or calibrating a pressure sensor of a mobile device.

In different embodiments, the process of FIG. 12 is performed using a processor of a mobile device, a server, a combination of a processor of a mobile device and a server, or other suitable machine(s).

As shown in FIG. 12, a difference in time between a first time and a second time is determined (step 1210), wherein the first time refers to when a first reference-level pressure value was determined from one or more measurements of pressure determined by a network of weather stations (which may be in the form of a time stamp), and the second time is a time when the first reference-level pressure value is requested by a mobile device or a server, or received by the mobile device or the server (e.g., from the network or from local storage of the mobile device or server) for possible use in estimating an altitude of a mobile device or calibrating a pressure sensor of a mobile device. Alternatively, the second time may be when a determination is made as to whether the first reference-level pressure value should or should not be used to calibrate a pressure sensor of a mobile device or to estimate an altitude of the mobile device. The difference in time can be a period of time since the first reference-level pressure value was originally determined or since the measurements of pressure from the network on which the first reference-level pressure value is based were measured, as measured up to some point in time, such as the second time or another time.

A determination is made as to whether the difference in time is less than a first threshold amount of time (e.g., 1 min) (step 1220).

If the difference in time is less than the first threshold amount of time, the first reference-level pressure value is used as a reference-level pressure to estimate an altitude of a mobile device or calibrate a pressure sensor of the mobile device (step 1230).

If the difference in time is not less than the first threshold amount of time, one of the approaches for improving the use of available pressure data when estimating an altitude of a mobile device or calibrating a pressure sensor of a mobile device is performed to determine an estimated reference-level pressure value for later use in estimating an altitude of the mobile device or calibrating a pressure sensor of the mobile device (step 1240). Embodiments of step 1240 are described below.

Figure 13A:
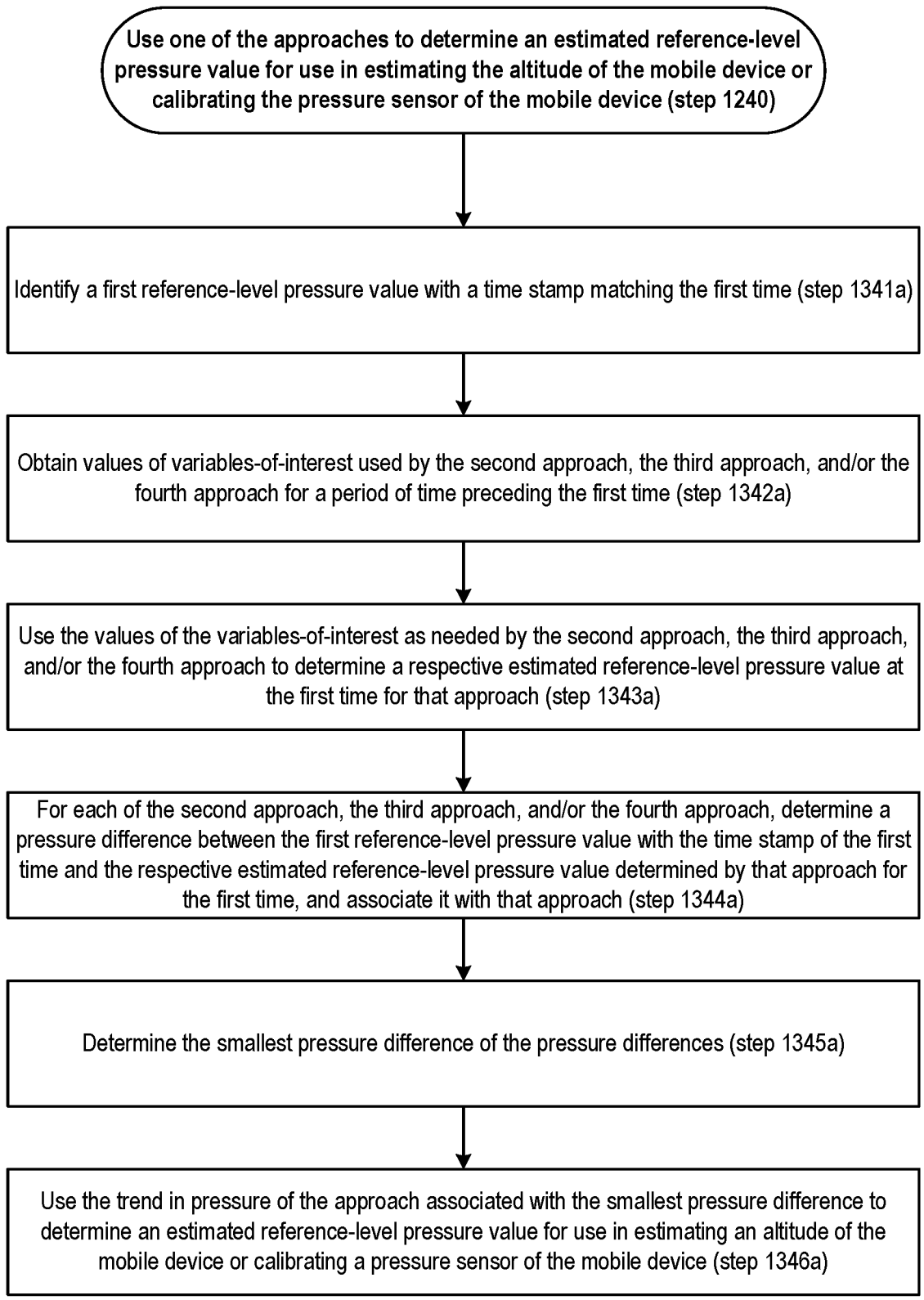
FIG. 13A, FIG. 13B, and FIG. 13C each show different processes for comparing results from different approaches, and then using the comparisons to select a particular approach that determines a reference-level pressure value for use in estimating an altitude of the mobile device or calibrating a pressure sensor of the mobile device.

One embodiment of step 1240 is shown in FIG. 13A. During this embodiment, the first reference-level pressure value with a time step matching the first time is identified (step 1341a).

Values of variables-of-interest used by the second approach, the third approach, and/or the fourth approach are obtained (e.g., retrieved from storage) for a period of time preceding the first time (step 1342a). By way of example, the variables-of-interest may include reference-level pressure values, temperatures, temperature variations, and/or other variables described previously in relation to the second approach, the third approach, and/or the fourth approach. For example: if two reference-level pressure values are being used with the second approach, then two consecutive reference-level pressure values with time stamps that precede the first time are collected for use by the second approach; if three reference-level pressure values are being used with the third approach, then three consecutive reference-level pressure values with time stamps that precede the first time are collected for use by the third approach; and if temperature and pressure trends are being used as input variables with the fourth approach, a temperature trend and a pressure trend used to produce a pressure trend that precedes the first time are collected for use by the fourth approach.

The values of variables-of-interest are used as needed by the second approach, the third approach, and/or the fourth approach to determine a respective estimated reference-level pressure value at the first time for that approach (step 1343a). By way of example, the estimated reference-level pressure values can have the same resolution as the reference-level pressure value with the time stamp of the first time (e.g., 36 Pa), or a different resolution (e.g., 1 Pa).

For each of the second approach, the third approach, and/or the fourth approach, a pressure difference between the first reference-level pressure value with the time stamp of the first time and the respective estimated reference-level pressure value determined by that approach for the first time is determined and associated with that approach (step 1344a).

The smallest pressure difference of the pressure differences is determined (step 1345a).

The approach associated with the smallest pressure difference is selected as the approach used to determine estimated reference-level pressure values for use in estimating an altitude of the mobile device or calibrating a pressure sensor of the mobile device (step 1346a). The selected approach can be used until a new reference-level pressure value is determined using measurements of pressure from the network.

By way of example, one implementation of the process shown in FIG. 13A includes the steps of: receiving a plurality of reference-level pressure values determined using measurements of pressure from a network of weather stations at past instances of time prior to the initial time when the reference-level pressure value was originally determined or since the one or more measurements of pressure on which the reference-level pressure value is based were measured; using linear extrapolation to determine a linearly-extrapolated trend of the plurality of reference-level pressure values; using quadratic extrapolation to determine a quadratically-extrapolated trend of the plurality of reference-level pressure values; using the linearly-extrapolated trend to determine a linearly-extrapolated reference-level pressure for the initial time; using the quadratically-extrapolated trend to determine a quadratically-extrapolated reference-level pressure for the initial time; determine a first difference between the reference-level pressure value and the linearly-extrapolated reference-level pressure; determine a second difference between the reference-level pressure value and the quadratically-extrapolated reference-level pressure; determine the smallest difference from among the first difference and the second difference; if the first difference is the smallest difference, determining that the trend in pressure is the linearly-extrapolated trend; and if the second difference is the smallest difference, determining that the trend in pressure is the quadratically-extrapolated trend. In another implementation of the process shown in FIG. 13A, the following steps are performed in addition to the previous steps of this paragraph: determining values of input variables for input into a decision tree regression flow that was formulated using historical values of the input variables and an output variable; producing a value of the output variable that represents a regression-based trend in pressure for the initial time by providing the determined values of the input variables to the decision tree regression flow; using the regression-based trend in pressure to determine a regression-based estimated reference-level pressure for the initial time; determine a third difference between the reference-level pressure value and the regression-based reference-level pressure; wherein determining the smallest difference from among the first difference and the second difference comprises determine the smallest difference from among the first difference, the second difference and the third difference; and if the third difference is the smallest difference, determining that the trend in pressure is the regression-based trend in pressure.

Figure 13B:
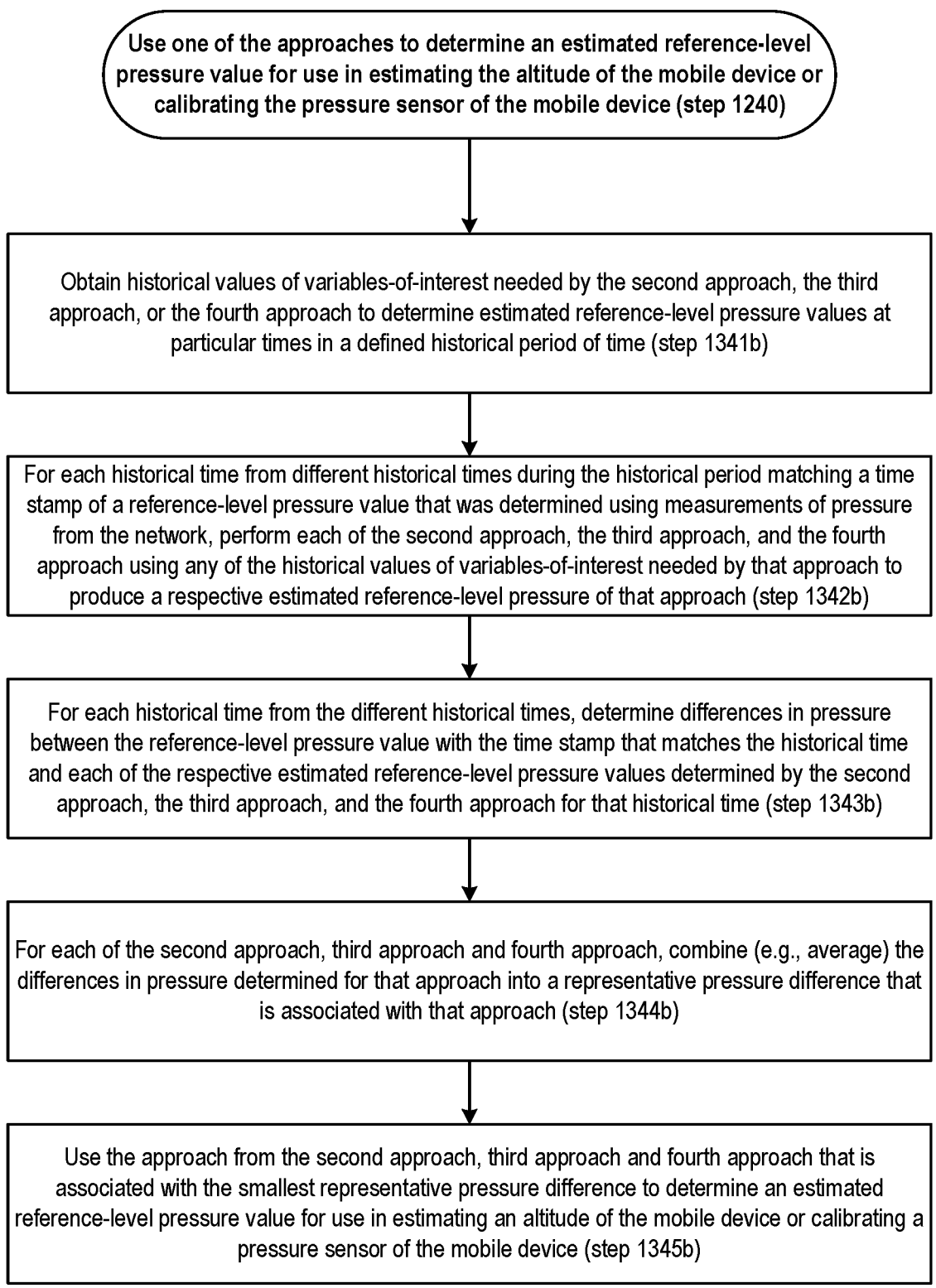

By way of example, one implementation of the process shown in FIG. 13B includes the steps of: determining a first linearly-extrapolated trend in pressure using a first set of reference-level pressure values; determining a first quadratically-extrapolated trend in pressure using the first set of reference-level pressure values; determining a first linearly-extrapolated reference-level pressure for the first historical time using the first linearly-extrapolated trend in pressure; determining a first quadratically-extrapolated reference-level pressure for the first historical time using the first quadratically-extrapolated trend in pressure; determine a first reference-level pressure value for the first historical time that is based on a first set of one or more measurements of pressure from the network of weather stations; determine a difference between the first reference-level pressure value and the first linearly-extrapolated reference-level pressure; determine a difference between the first reference-level pressure value and the first quadratically-extrapolated reference-level pressure; determining a second linearly-extrapolated trend in pressure using a second set of reference-level pressure values; determining a second quadratically-extrapolated trend in pressure using the second set of reference-level pressure values; determining a second linearly-extrapolated reference-level pressure for the second historical time using the second linearly-extrapolated trend in pressure; determining a second quadratically-extrapolated reference-level pressure for the second historical time using the second quadratically-extrapolated trend in pressure; determine a second reference-level pressure value for the second historical time that is based on a second set of one or more measurements of pressure from the network of weather stations; determine a difference between the second reference-level pressure value and the second linearly-extrapolated reference-level pressure; determine a difference between the second reference-level pressure value and the second quadratically-extrapolated reference-level pressure; determining a first difference by combining at least (i) the difference between the first reference-level pressure value and the first linearly-extrapolated reference-level pressure and (ii) the difference between the second reference-level pressure value and the second linearly-extrapolated reference-level pressure; determining a second difference by combining at least (i) the difference between the first reference-level pressure value and the first quadratically-extrapolated reference-level pressure and (ii) the difference between the second reference-level pressure value and the second quadratically-extrapolated reference-level pressure; determining the smallest difference from among the first difference and the second difference; if the first difference is the smallest difference, (a) using linear extrapolation to determine a first trend of a plurality of reference-level pressure values that were determined using measurements of pressure from a network of weather stations at past instances of time prior to the first time, and (b) using the first trend of the plurality of reference-level pressure values as the trend in pressure; and if the second difference is the smallest difference, (a) using quadratic extrapolation to determine a second trend of the plurality of reference-level pressure values, and (b) using the second trend of the plurality of reference-level pressure values as the trend in pressure. In another implementation of the process shown in FIG. 13B, the following steps are performed in addition to the previous steps of this paragraph: determining a first set of values of input variables for input into a decision tree regression flow that was formulated using historical values of the input variables and an output variable, and producing a first value of the output variable that represents a first regression-based trend in pressure for the first historical time by providing the first set of values of the input variables to the decision tree regression flow; determining a first regression-based reference-level pressure for the first historical time using the first regression-based trend in pressure; determine a difference between the first reference-level pressure value and the first regression-based reference-level pressure; determining a second set of values of the input variables for input into the decision tree regression flow, and producing a second value of the output variable that represents a second regression-based trend in pressure for the second historical time by providing the second set of values of the input variables to the decision tree regression flow; determining a second regression-based reference-level pressure for the second historical time using the second regression-based trend in pressure; determine a difference between the second reference-level pressure value and the second regression-based reference-level pressure; determining a third difference by combining at least (i) the difference between the first reference-level pressure value and the first regression-based reference-level pressure and (ii) the difference between the second reference-level pressure value and the second regression-based reference-level pressure; wherein determining the smallest difference from among the first difference and the second difference comprises determining the smallest difference from among the first difference, the second difference and the third difference; and if the third difference is the smallest difference, using the decision tree regression flow to determine the trend in pressure.

Another embodiment of step 1240 is shown in FIG. 13B. During this embodiment, historical values of variables-of-interest needed by the second approach, the third approach, or the fourth approach to determine estimated reference-level pressure values at particular times in a defined historical period of time are obtained, where the historical values were determined based on atmospheric measurements from the network of weather stations (step 1341*b*). By way of example, the historical period of time may include the same daily time period over n days (e.g., the hour between 1 PM and 2 PM for each day in the past 30 days prior to a current time), and the variables-of-interest may include reference-level pressure values, temperatures, temperature variations, and/or other variables needed by the second approach, the third approach, or the fourth approach to determine an estimated reference-level pressure value at different times during the historical period of time.

For each historical time from different historical times during the historical period matching a time stamp of a reference-level pressure value that was determined using measurements of pressure from the network, each of the second approach, the third approach, and the fourth approach are performed using any of the historical values of variables-of-interest needed by that approach to produce a respective estimated reference-level pressure of that approach for that historical time (step 1342*b*). For example, if a reference-level pressure value determined by the network has a time stamp of 1:01 PM on Mar. 3, 2018, then two immediately-preceding reference-level pressure values from the collected historical data (e.g., with time stamps of 12:01 PM and 11:01 AM on Mar. 3, 2018 when a temporal resolution of the network is 1 hour) are used with the second approach to determine an estimated reference-level pressure value for 1:01 PM on Mar. 3, 2018.

For each historical time from the different historical times, differences in pressure between the reference-level pressure value with the time stamp that matches the historical time and each of the respective estimated reference-level pressure values determined by the second approach, the third approach, and the fourth approach for that historical time are determined (step 1343*b*).

For each of the second approach, third approach and fourth approach, the differences in pressure determined for that approach are combined (e.g., averaged) into a representative pressure difference that is associated with that approach (step 1344*b*).

The approach from the second approach, third approach and fourth approach that is associated with the smallest representative pressure difference is selected as the approach used to determine an estimated reference-level pressure value for use in estimating an altitude of the mobile device or calibrating a pressure sensor of the mobile device (step 1345*b*).

The process of FIG. 13B can be repeated for different historical periods of time and may result in selection of different approaches for different historical periods of time.

Figure 13C:
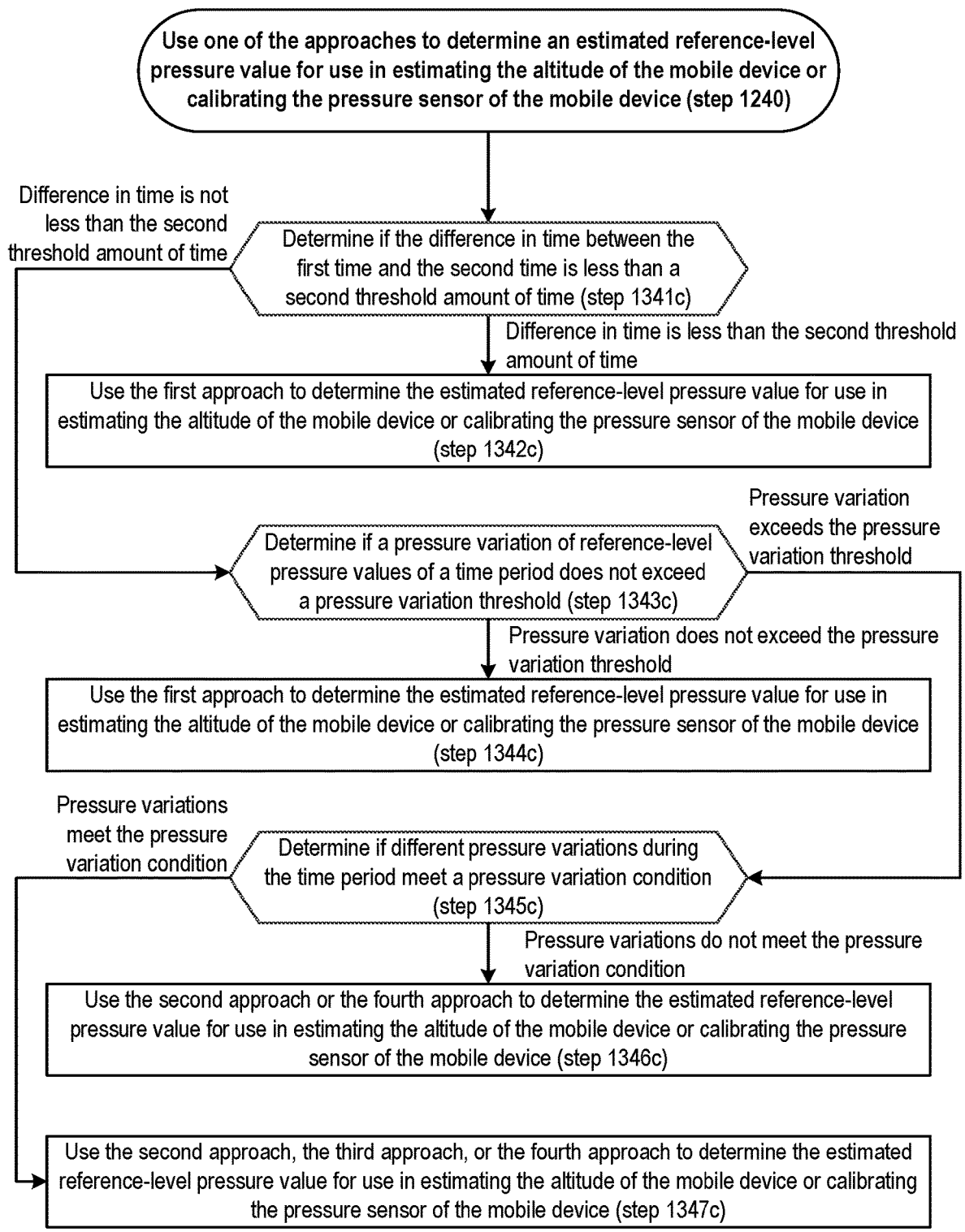

Yet another embodiment of step 1240 is shown in FIG. 13C. During this embodiment, a determination is made as to whether the difference in time between the first time and the second time is less than a second threshold amount of time (e.g., 10 min) (step 1341*c*).

If the difference in time between the first time and the second time is less than the second threshold amount of time, the first approach is used to determine an estimated reference-level pressure value for use in estimating an altitude of the mobile device or calibrating a pressure sensor of the mobile device (step 1342*c*). Alternatively, the most-recently received reference-level pressure value is used as the estimated reference-level pressure value.

If the difference in time between the first time and the second time is not less than the second threshold amount of time, a determination is made as to whether a pressure variation of reference-level pressure values determined using measurements of pressure measured by the network during a time period (e.g., 3 hours) prior to and optionally including the first time does not exceed a pressure variation threshold (e.g., 0.2 Pa/hour) (step 1343*c*).

If the pressure variation of reference-level pressure values during the time period does not exceed the pressure variation threshold, the first approach is used to determine an estimated reference-level pressure value for use in estimating an altitude of the mobile device or calibrating a pressure sensor of the mobile device (step 1344*c*), or alternatively the most-recently received reference-level pressure value is used as the estimated reference-level pressure value, since the trend of reference-level pressure values is relatively flat and the use of a previous reference-level pressure is suitable when changes in pressure are small over time.

If the pressure variation of reference-level pressure values during the time period exceeds the pressure variation threshold, a determination is made as to whether different pressure variations during the time period meet a pressure variation condition (step 1345*c*). In a first embodiment of step 1345*c*, the measured pressure variations meet the condition when the measurement pressure variations are within a threshold amount of pressure variation from each other (e.g., 1 Pa/hour). In a second embodiment of step 1345*c*, the measured pressure variations meet the condition when a standard deviation of the pressure variations is below a threshold amount of standard deviation (e.g., when a variation measured between 1-2 AM is 10 Pa/hour, a variation measured between 2-3 AM is 9 Pa/hour, and a variation measured between 3-4 AM is 9.5 Pa/hour, the standard deviation of (9,9.5,10) is 0.4 Pa/hour, which is less than a threshold amount of standard deviation of 1 Pa/hour).

If the different pressure variations during the time period do not meet the pressure variation condition, the second approach or the fourth approach is used, but the third approach is not used to determine an estimated reference-level pressure value (step 1346*c*). The third approach of using quadratic extrapolation is not used to determine an estimated reference-level pressure value since the third approach can produce estimated reference-level pressure values that undesirably overshoot or undershoot true pressure at the reference-level altitude under conditions when pressure variation is not steady or consistent over time. In one embodiment of step 1346*c*, one approach from the second approach or the fourth approach is selected over the other approach for use. Selection of an approach over other approaches can be carried out using the method shown in FIG. 13B, which was previously discussed.

If the different pressure variations meet the pressure variation condition, one approach from the second approach, the third approach, or the fourth approach is used (1347*c*). The third approach of using quadratic extrapolation can be used since it can produce estimated reference-level pressure values that will not undesirably overshoot or undershoot true pressure at the reference-level altitude under conditions when pressure variation is consistent. In one embodiment of step 1347*c*, one approach from the second approach, the third approach, or the fourth approach is selected over the remaining approaches from the second approach, the third approach, or the fourth approach for use in determining an estimated reference-level pressure value. Selection of an approach over other approaches can be carried out using the method shown in FIG. 13B, which was previously discussed.

By way of example, one implementation of the process shown in FIG. 13C includes the steps of: determining if the period of time is less than a second threshold amount of time; if the period of time is less than the second threshold amount of time, making the first determination that the reference-level pressure value should be used; if the period of time is not less than the second threshold amount of time, determining if a pressure variation of reference-level pressure values of a time period does not exceed a pressure variation threshold; if the pressure variation does not exceed the pressure variation threshold, making the first determination that the reference-level pressure value should be used; if the pressure variation exceeds the pressure variation threshold, making the second determination that the reference-level pressure value should not be used, and determining if different pressure variations during the time period meet a pressure variation condition; if the different pressure variations do not meet the pressure variation condition, using linear extrapolation or decision tree regression (as described previously in this disclosure) to determine the trend in pressure; and if the different pressure variations meet the pressure variation condition, using linear extrapolation, quadratic extrapolation or decision tree regression (as described previously in this disclosure) to determine the trend in pressure.

In some embodiments, each of the processes in FIG. 13A, FIG. 13B and FIG. 13C are each performed without the steps of FIG. 12 (i.e., without steps 1210, 1220 and 1230 being performed).

Use of Approaches to Determine Temperature Values

The first approach, the second approach, and the third approach have been discussed above in terms of determining an estimated reference-level pressure value using reference-level pressure values from a network of weather stations. Each of these approaches can be modified to determine estimated temperature values using measured temperature values (e.g., by replacing "reference-level pressure value"

with "temperature value" in the respective discussion for each approach with necessary modifications as would be understood by one of ordinary skill in the art). The fourth approach can be extended to predict a temperature trend instead of a pressure trend that can be used to plot estimated temperatures at times after a measured temperature value. The same combinations of variables may also be used—e.g., in particular, the input variables are preferably time of day, most-recent measurement of temperature, and most-recent measured temperature trend, with future temperature trend as the output variable. Determined temperatures can also be used to estimate an altitude of a mobile device or calibrate a pressure sensor of the mobile device (e.g., using a common barometric formula that requires both reference-level pressure and ambient temperature, as described elsewhere herein).

In practice, estimated temperature accuracy typically needs to be within 2 degrees to achieve floor-level altitude or calibration accuracy. Since temperature does not typically change by more than 2 degrees Celsius per hour under nominal conditions, estimated temperatures between measurements of temperature separated by 1 hour is typically sufficient. However, there are circumstances where having more frequent or accurate measurements of temperature would be beneficial. One circumstance is when the most-recent measured temperature trend (i.e., rate of change) is greater than 3 degrees Celsius per hour, such that temperature measurements are ideally received every 40 minutes or less. Another circumstance is when a location of the mobile device above or below a reference-level altitude (e.g., 0 m HAE) exceeds a threshold amount of vertical distance, such that any temperature error can magnify an altitude error $\Delta h$ as follows $\Delta h = h \Delta T/T$, where h is the vertical distance between the mobile device and the reference-level altitude, T is an estimated temperature (e.g., determined using an approach described herein), and $\Delta T$ is an error in the temperature estimate from true temperature.

Technical Benefits

Mobile devices are routinely used to estimate altitudes of users based on (i) reference pressures from a network of reference pressure sensors and (ii) measurements of pressure from pressure sensors of the mobile devices. Unfortunately, limitations in the functionality of the network of reference pressure sensors can impact the accuracy of estimated altitudes, which impairs different uses of the estimated altitudes (e.g., emergency response, navigation, calibration, etc.). For example, some networks of reference pressure sensors do not produce measured pressure data at a minimum frequency needed for sensor calibration or altitude estimation. Processes described herein improve the fields of calibration and location determination by improving how reference-level pressures are determined for use in calibrating a drifting pressure sensor of a mobile device or estimating an altitude of the mobile device to within a threshold amount of altitude from true altitude (e.g., 1.0 meters or less). In particular, processes described herein improve the functionality of reference pressure sensor networks by generating new and useful data (e.g., estimated reference-level pressures) needed for sensor calibration or altitude estimation at a current time using pressure data that was determined at a previous time despite that pressure data not necessarily being reflective of pressure conditions for the current time. The resulting estimation of reference-level pressures enables more accurate and more reliable pressure sensor calibration or estimated altitudes, which in turn provide for quicker emergency response times or otherwise improve the usefulness of estimated altitudes.

Compared to previous approaches, performance of the processes described herein provide for improved uses of legacy networks by generating reference-level pressure data during time periods when such data is not produced by the legacy networks. Without the processes described herein, such legacy networks could not be consistently or reliably used to determine pressure-based estimates of mobile device altitudes.

Other Aspects

Discussion herein relates to reference-level pressure values that are determined using one or more measurements of pressure from weather stations in a network. As is well-known, such reference-level pressure values may be determined by the network or by another system component (e.g., a server, a mobile device, or other). If the latter is true, the reference-level pressure value is received from the that other system component for use. Discussion herein also relates to receiving reference-level pressure values (e.g., from a network). Different system components may receive the reference-level pressure value, including a mobile device, a server, or other component(s) capable of carrying out any of approaches and processes described herein.

Any method (also referred to as a "process" or an "approach") described or otherwise enabled by disclosure herein may be implemented by hardware components (e.g., machines), software modules (e.g., stored in machine-readable media), or a combination thereof. By way of example, machines may include one or more computing device(s), processor(s), controller(s), integrated circuit(s), chip(s), system(s) on a chip, server(s), programmable logic device(s), field programmable gate array(s), electronic device(s), special purpose circuitry, and/or other suitable device(s) described herein or otherwise known in the art. One or more non-transitory machine-readable media embodying program instructions that, when executed by one or more machines, cause the one or more machines to perform or implement operations comprising the steps of any of the methods described herein are contemplated herein. As used herein, machine-readable media includes all forms of machine-readable media (e.g. one or more non-volatile or volatile storage media, removable or non-removable media, integrated circuit media, magnetic storage media, optical storage media, or any other storage media, including RAM, ROM, and EEPROM) that may be patented under the laws of the jurisdiction in which this application is filed, but does not include machine-readable media that cannot be patented under the laws of the jurisdiction in which this application is filed. Systems that include one or more machines and one or more non-transitory machine-readable media are also contemplated herein. One or more machines that perform or implement, or are configured, operable or adapted to perform or implement operations comprising the steps of any methods described herein are also contemplated herein. Method steps described herein may be order independent and can be performed in parallel or in an order different from that described if possible to do so. Different method steps described herein can be combined to form any number of methods, as would be understood by one of ordinary skill in the art. Any method step or feature disclosed herein may be omitted from a claim for any reason. Certain well-known structures and devices are not shown in figures to avoid obscuring the concepts of the present disclosure. When two things are "coupled to" each other, those two things may be directly connected together, or separated by one or more intervening things. Where no lines or intervening things connect two particular things, coupling of those things is contemplated in at least one embodiment unless otherwise stated. Where an output of one thing and an input of another thing are coupled to each other, information sent from the output is received in its outputted form or a modified version thereof by the input even if the information passes through one or more intermediate things. Any known communication pathways and protocols may be used to transmit information (e.g., data, commands, signals, bits, symbols, chips, and the like) disclosed herein unless otherwise stated. The words comprise, comprising, include, including and the like are to be construed in an inclusive sense (i.e., not limited to) as opposed to an exclusive sense (i.e., consisting only of). Words using the singular or plural number also include the plural or singular number, respectively, unless otherwise stated. The word "or" and the word "and" as used in the Detailed Description cover any of the items and all of the items in a list unless otherwise stated. The words some, any and at least one refer to one or more. The terms may or can are used herein to indicate an example, not a requirement— e.g., a thing that may or can perform an operation, or may or can have a characteristic, need not perform that operation or have that characteristic in each embodiment, but that thing performs that operation or has that characteristic in at least one embodiment. Unless an alternative approach is described, access to data from a source of data may be achieved using known techniques (e.g., requesting component requests the data from the source via a query or other known approach, the source searches for and locates the data, and the source collects and transmits the data to the requesting component, or other known techniques).

Figure 14:
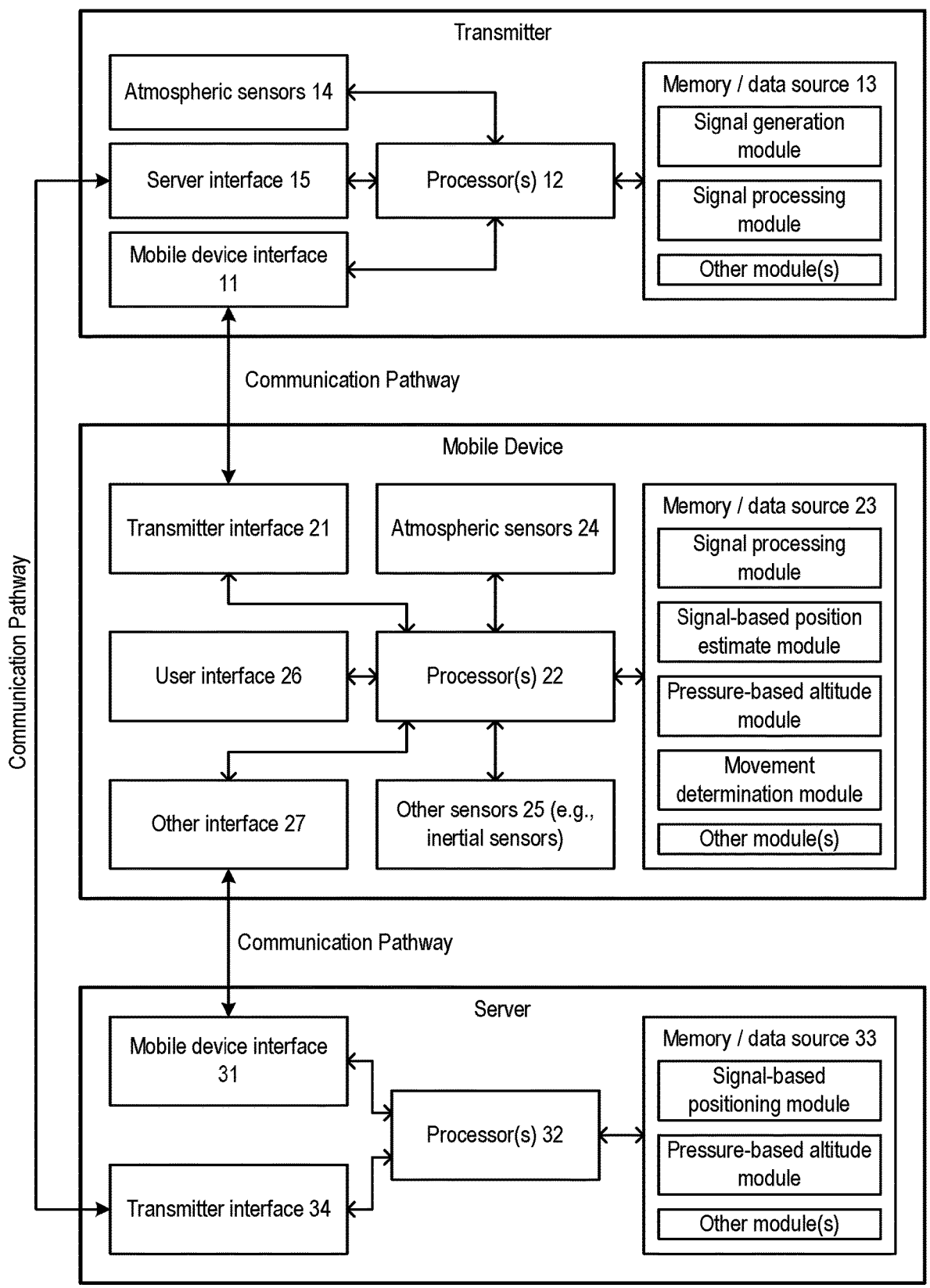
FIG. 14 illustrates components of a transmitter, a mobile device, and a server.

FIG. 14 illustrates components of a transmitter, a mobile device, and a server. Examples of communication pathways are shown by arrows between components.

By way of example in FIG. 14, each of the transmitters may include: a mobile device interface 11 for exchanging information with a mobile device (e.g., an antenna and RF front end components known in the art or otherwise disclosed herein); one or more processor(s) 12; memory/data source 13 for providing storage and retrieval of information and/or program instructions; atmospheric sensor(s) 14 for measuring environmental conditions (e.g., pressure, temperature, other) at or near the transmitter; a server interface 15 for exchanging information with a server (e.g., an antenna, a network interface, or other); and any other components known to one of ordinary skill in the art. The memory/data source 13 may include memory storing software modules with executable instructions, and the processor(s) 12 may perform different actions by executing the instructions from the modules, including: (i) performance of part or all of the methods as described herein or otherwise understood by one of skill in the art as being performable at the transmitter; (ii) generation of positioning signals for transmission using a selected time, frequency, code, and/or phase; (iii) processing of signaling received from the mobile device or other source; or (iv) other processing as required by operations described in this disclosure. Signals generated and transmitted by a transmitter may carry different information that, once determined by a mobile device or a server, may identify the following: the transmitter; the transmitter's position; environmental conditions at or near the transmitter; and/or other information known in the art. The atmospheric sensor(s) 14 may be integral with the transmitter, or separate from the transmitter and either co-located with the transmitter or located in the vicinity of the transmitter (e.g., within a threshold amount of distance).

By way of example FIG. 14, the mobile device may include: a transmitter interface 21 for exchanging information with a transmitter (e.g., an antenna and RF front end components known in the art or otherwise disclosed herein); one or more processor(s) 22; memory/data source 23 for providing storage and retrieval of information and/or program instructions; atmospheric sensor(s) 24 for measuring environmental conditions (e.g., pressure, temperature, other) at the mobile device; other sensor(s) 25 for measuring other conditions (e.g., inertial sensors for measuring movement and orientation); a user interface 26 (e.g., display, keyboard, microphone, speaker, other) for permitting a user to provide inputs and receive outputs; another interface 27 for exchanging information with the server or other devices external to the mobile device (e.g., an antenna, a network interface, or other); and any other components known to one of ordinary skill in the art. A GNSS interface and processing unit (not shown) are contemplated, which may be integrated with other components (e.g., the interface 21 and the processors 22) or a standalone antenna, RF front end, and processors dedicated to receiving and processing GNSS signaling. The memory/data source 23 may include memory storing software modules with executable instructions, and the processor(s) 22 may perform different actions by executing the instructions from the modules, including: (i) performance of part or all of the methods as described herein or otherwise understood by one of ordinary skill in the art as being performable at the mobile device; (ii) estimation of an altitude of the mobile device based on measurements of pressure form the mobile device and transmitter(s), temperature measurement(s) from the transmitter(s) or another source, and any other information needed for the computation); (iii) processing of received signals to determine position information (e.g., times of arrival or travel time of the signals, pseudoranges between the mobile device and transmitters, transmitter atmospheric conditions, transmitter and/or locations or other transmitter information); (iv) use of position information to compute an estimated position of the mobile device; (v) determination of movement based on measurements from inertial sensors of the mobile device; (vi) GNSS signal processing; or (vii) other processing as required by operations described in this disclosure.

By way of example FIG. 14, the server may include: a mobile device interface 21 for exchanging information with a mobile device (e.g., an antenna, a network interface, or other); one or more processor(s) 32; memory/data source 33 for providing storage and retrieval of information and/or program instructions; a transmitter interface 34 for exchanging information with a transmitter (e.g., an antenna, a network interface, or other); and any other components known to one of ordinary skill in the art. The memory/data source 33 may include memory storing software modules with executable instructions, and the processor(s) 32 may perform different actions by executing instructions from the modules, including: (i) performance of part or all of the methods as described herein or otherwise understood by one of ordinary skill in the art as being performable at the server; (ii) estimation of an altitude of the mobile device; (iii) computation of an estimated position of the mobile device; or (iv) other processing as required by operations described in this disclosure. Steps performed by servers as described herein may also be performed on other machines that are remote from a mobile device, including computers of enterprises or any other suitable machine.

Certain aspects disclosed herein relate to estimating the positions of mobile devices—e.g., where the position is represented in terms of: latitude, longitude, and/or altitude coordinates; x, y, and/or z coordinates; angular coordinates; or other representations. Various techniques to estimate the position of a mobile device can be used, including trilateration, which is the process of using geometry to estimate the position of a mobile device using distances traveled by different "positioning" (or "ranging") signals that are received by the mobile device from different beacons (e.g., terrestrial transmitters and/or satellites). If position information like the transmission time and reception time of a positioning signal from a beacon are known, then the difference between those times multiplied by speed of light would provide an estimate of the distance traveled by that positioning signal from that beacon to the mobile device. Different estimated distances corresponding to different positioning signals from different beacons can be used along with position information like the locations of those beacons to estimate the position of the mobile device. Positioning systems and methods that estimate a position of a mobile device (in terms of latitude, longitude and/or altitude) based on positioning signals from beacons (e.g., transmitters, and/or satellites) and/or atmospheric measurements are described in co-assigned U.S. Pat. No. 8,130,141, issued Mar. 6, 2012, and U.S. Pat. Pub. No. 2012/0182180, published Jul. 19, 2012. It is noted that the term "positioning system" may refer to satellite systems (e.g., Global Navigation Satellite Systems (GNSS) like GPS, GLONASS, Galileo, and Compass/Beidou), terrestrial transmitter systems, and hybrid satellite/terrestrial systems.

This application relates to the following related application(s): U.S. Pat. Appl. No. 62/745,175, filed 12 Oct. 2018 entitled SYSTEMS AND METHODS FOR PRESSURE-BASED ESTIMATION OF A MOBILE DEVICE ALTITUDE OR CALIBRATION OF A PRESSURE SENSOR. The content of each of the related application(s) is hereby incorporated by reference herein in its entirety.

The invention claimed is:

1. A method for pressure-based estimation of a mobile device altitude or calibration of a pressure sensor, the method comprising:
    determining if a reference-level pressure value based on one or more measurements of pressure from a network of weather stations should or should not be used to calibrate the pressure sensor of a mobile device or to estimate an altitude of the mobile device by:
        determining a period of time since an initial time when the reference-level pressure value was originally determined or since the one or more measurements of pressure on which the reference-level pressure value is based were measured; and
        determining if the period of time is less than a first threshold amount of time, wherein a first determination is made that the reference-level pressure value should be used when the period of time is less than the first threshold amount of time, and a second determination is made that the reference-level pressure value should not be used when the period of time is not less than the first threshold amount of time;
    if the first determination is made that the reference-level pressure value should be used, using the reference-level pressure value to calibrate the pressure sensor of the mobile device or to estimate the altitude of the mobile device; and
    if the second determination is made that the reference-level pressure value should not be used,
        (a) determining a trend in pressure, where the trend indicates a difference in the pressure in time,
        (b) at a first time, determining a first estimated reference-level pressure value based on the trend, and
        (c) using the first estimated reference-level pressure value to calibrate the pressure sensor of the mobile device or to estimate the altitude of the mobile device.

2. The method of claim 1, wherein the method comprises:
    at a second time, determining a second estimated reference-level pressure value based on the trend, and
    using the second estimated reference-level pressure value to calibrate the pressure sensor of the mobile device or to estimate the altitude of the mobile device.

3. The method of claim 1, wherein determining the trend in pressure comprises:
    receiving a plurality of reference-level pressure values determined using measurements of pressure from the network of weather stations at past instances of time prior to the first time;
    using extrapolation to determine a trend of the plurality of reference-level pressure values; and
    using the trend of the plurality of reference-level pressure values as the trend in pressure.

4. The method of claim 3, wherein the extrapolation is linear extrapolation, and the plurality of reference-level pressure values comprise two or more reference-level pressure values determined at two or more respective times prior to the first time.

5. The method of claim 3, wherein the extrapolation is quadratic extrapolation.

6. The method of claim 3, wherein determining the trend in pressure comprises:
    determining a fit metric associated with the trend of the plurality of reference-level pressure values;
    determining if the fit metric meets a threshold fit condition;
    if the fit metric meets the threshold fit condition, using the trend of the plurality of reference-level pressure values as the trend in pressure, wherein determining the first estimated reference-level pressure value based on the trend and using the first estimated reference-level pressure value to calibrate the pressure sensor of the mobile device or to estimate the altitude of the mobile device are performed only if the fit metric meets the threshold fit condition.

7. The method of claim 6, wherein if the fit metric does not meet the threshold fit condition, the method comprises:
    receiving a new reference-level pressure value based on one or more measurements of pressure from the network of weather stations that were measured after the first time;
    using the new reference-level pressure value to calibrate the pressure sensor of the mobile device or to estimate the altitude of the mobile device.

8. The method of claim 6, wherein if the fit metric does not meet the threshold fit condition, the method comprises:
    receiving an additional plurality of reference-level pressure values determined using measurements of pressure from the network of weather stations during past instances of time prior to a second time that is later than the first time;
    using extrapolation to determine an additional trend of the additional plurality of reference-level pressure values;

determining an additional fit metric associated with the additional trend of the plurality of reference-level pressure values; and if the additional fit metric meets the threshold fit condition, determining a second estimated reference-level pressure value based on the additional trend, and using the second estimated reference-level pressure value to calibrate the pressure sensor of the mobile device or to estimate the altitude of the mobile device.

9. The method of claim 1, wherein the trend is determined using decision tree regression.

10. The method of claim 1, wherein determining the trend in pressure comprises:

identifying a set of input variables;

determining values of the input variables for input into a decision tree regression flow that was formulated using historical values of the input variables and an output variable; and providing the determined values of the input variables to the decision tree regression flow to produce a value of the output variable that represents the trend in pressure.

11. The method of claim 1, wherein the period of time is a difference in time between a time stamp of the reference-level pressure value and a later time is a time when the determination is made as to whether the reference-level pressure value should or should not be used to calibrate the pressure sensor of the mobile device or to estimate the altitude of the mobile device.

12. The method of claim 1, wherein determining a trend in pressure comprises:

receiving a plurality of reference-level pressure values determined using measurements of pressure from the network of weather stations at past instances of time prior to the initial time when the reference-level pressure value was originally determined or since the one or more measurements of pressure on which the reference-level pressure value is based were measured;

using linear extrapolation to determine a linearly-extrapolated trend of the plurality of reference-level pressure values;

using quadratic extrapolation to determine a quadratically-extrapolated trend of the plurality of reference-level pressure values;

using the linearly-extrapolated trend to determine a linearly-extrapolated reference- level pressure for the initial time;

determining a first difference between the reference-level pressure value and the linearly-extrapolated reference-level pressure;

determining a second difference between the reference-level pressure value and the quadratically-extrapolated reference-level pressure;

determining the smallest difference from among the first difference and the second difference;

if the first difference is the smallest difference, determining that the trend in pressure is the linearly-extrapolated trend; and if the second difference is the smallest difference, determining that the trend in pressure is the quadratically-extrapolated trend.

13. The method of claim 12, wherein determining a trend in pressure comprises:

determining values of input variables for input into a decision tree regression flow that was formulated using historical values of the input variables and an output variable;

producing a value of the output variable that represents a regression-based trend in pressure for the initial time by providing the determined values of the input variables to the decision tree regression flow;

using the regression-based trend in pressure to determine a regression-based estimated reference-level pressure for the initial time;

determining a third difference between the reference-level pressure value and the regression-based estimated reference-level pressure;

wherein determining the smallest difference from among the first difference and the second difference comprises determine the smallest difference from among the first difference, the second difference and the third difference; and if the third difference is the smallest difference, determining that the trend in pressure is the regression-based trend in pressure.

14. The method of claim 1, wherein determining a trend in pressure comprises:

determining a first linearly-extrapolated trend in pressure using a first set of reference-level pressure values;

determining a first quadratically-extrapolated trend in pressure using the first set of reference-level pressure values;

determining a first linearly-extrapolated reference-level pressure for a first historical time using the first linearly-extrapolated trend in pressure;

determining a first quadratically-extrapolated reference-level pressure for the first historical time using the first quadratically-extrapolated trend in pressure;

determining a first reference-level pressure value for the first historical time that is based on a first set of one or more measurements of pressure from the network of weather stations;

determining a difference between the first reference-level pressure value and the first linearly-extrapolated reference-level pressure;

determining a difference between the first reference-level pressure value and the first quadratically-extrapolated reference-level pressure;

determining a second linearly-extrapolated trend in pressure using a second set of reference-level pressure values;

determining a second quadratically-extrapolated trend in pressure using the second set of reference-level pressure values;

determining a second linearly-extrapolated reference-level pressure for a second historical time using the second linearly-extrapolated trend in pressure;

determining a second quadratically-extrapolated reference-level pressure for the second historical time using the second quadratically-extrapolated trend in pressure;

determining a second reference-level pressure value for the second historical time that is based on a second set of one or more measurements of pressure from the network of weather stations;

determining a difference between the second reference-level pressure value and the second linearly-extrapolated reference-level pressure;

determining a difference between the second reference-level pressure value and the second quadratically-extrapolated reference-level pressure;

determining a first difference by combining at least (i) the difference between the first reference-level pressure value and the first linearly-extrapolated reference-level pressure and (ii) the difference between the second reference-level pressure value and the second linearly-extrapolated reference-level pressure;

determining a second difference by combining at least (i) the difference between the first reference-level pressure value and the first quadratically-extrapolated reference-level pressure and (ii) the difference between the second reference-level pressure value and the second quadratically-extrapolated reference-level pressure;

determining the smallest difference from among the first difference and the second difference;

if the first difference is the smallest difference:
  (a) using linear extrapolation to determine a first trend of a plurality of reference-level pressure values that were determined using measurements of pressure from a network of weather stations at past instances of time prior to the first time, and
  (b) using the first trend of the plurality of reference-level pressure values as the trend in pressure; and if the second difference is the smallest difference:
  (c) using quadratic extrapolation to determine a second trend of the plurality of reference-level pressure values, and
  (d) using the second trend of the plurality of reference-level pressure values as the trend in pressure.

15. The method of claim 14, wherein determining a trend in pressure comprises:

determining a first set of values of input variables for input into a decision tree regression flow that was formulated using historical values of the input variables and an output variable, and producing a first value of the output variable that represents a first regression-based trend in pressure for the first historical time by providing the first set of values of the input variables to the decision tree regression flow;

determining a first regression-based reference-level pressure for the first historical time using the first regression-based trend in pressure;

determining a difference between the first reference-level pressure value and the first regression-based reference-level pressure;

determining a second set of values of the input variables for input into the decision tree regression flow, and producing a second value of the output variable that represents a second regression-based trend in pressure for the second historical time by providing the second set of values of the input variables to the decision tree regression flow;

determining a second regression-based reference-level pressure for the second historical time using the second regression-based trend in pressure;

determining a difference between the second reference-level pressure value and the second regression-based reference-level pressure;

determining a second set of values of the input variables for input into the decision tree regression flow, and producing a second value of the output variable that represents a second regression-based trend in pressure for the second historical time by providing the second set of values of the input variables to the decision tree regression flow;

determining a second regression-based reference-level pressure for the second historical time using the second regression-based trend in pressure;

determining a difference between the second reference-level pressure value and the second regression-based reference-level pressure;

determining a third difference by combining at least (i) the difference between the first reference-level pressure value and the first regression-based reference-level pressure and (ii) the difference between the second reference-level pressure value and the second regression-based reference-level pressure;

wherein determining the smallest difference from among the first difference and the second difference comprises determining the smallest difference from among the first difference, the second difference and the third difference; and if the third difference is the smallest difference, using the decision tree regression flow to determine the trend in pressure.

16. The method of claim 1, wherein the method comprises:

determining if the period of time is less than a second threshold amount of time;

if the period of time is less than the second threshold amount of time, making the first determination that the reference-level pressure value should be used;

if the period of time is not less than the second threshold amount of time, determining if a pressure variation of reference-level pressure values of a time period does not exceed a pressure variation threshold;

if the pressure variation does not exceed the pressure variation threshold, making the first determination that the reference-level pressure value should be used;

if the pressure variation exceeds the pressure variation threshold, making the second determination that the reference-level pressure value should not be used, and determining if different pressure variations during the time period meet a pressure variation condition;

if the different pressure variations do not meet the pressure variation condition, using linear extrapolation or decision tree regression to determine the trend in pressure; and if the different pressure variations meet the pressure variation condition, using linear extrapolation, quadratic extrapolation or decision tree regression to determine the trend in pressure.

17. One or more non-transitory machine-readable media embodying program instructions that, when executed by one or more machines, cause the one or more machines to implement the method of claim 1.

18. A system for pressure-based estimation of a mobile device altitude or calibration of a pressure sensor, the system comprising: a memory comprising computer-executable instructions; and a machine configured to execute the computer-executable instructions and cause a processing system to perform the method of claim 1.

* * * * *

UNITED STATES PATENT AND TRADEMARK OFFICE
CERTIFICATE OF CORRECTION

| | |
|---|---|
| PATENT NO. | : 11,536,564 B2 |
| APPLICATION NO. | : 16/405687 |
| DATED | : December 27, 2022 |
| INVENTOR(S) | : Michael Dormody, Badrinath Nagarajan and Guiyuan Han |

It is certified that error appears in the above-identified patent and that said Letters Patent is hereby corrected as shown below:

In the Claims

Claim 15, Column 29, Line 54, please delete:
"determining a second set of values of the input variables or input into the decision tree regression flow, and producing a second value of the output variable that represents a second regression-based trend in pressure for the second historical time by providing the second set of values of the input variables to the decision tree regression flow;
determining a second regression-based reference-level pressure for the second historical time using the second regression-based trend in pressure;
determining a difference between the second reference-level pressure value and the second regression-based reference-level pressure;"

Signed and Sealed this
Eleventh Day of April, 2023

Katherine Kelly Vidal
*Director of the United States Patent and Trademark Office*